United States Patent
Hara et al.

(10) Patent No.: US 9,116,632 B2
(45) Date of Patent: Aug. 25, 2015

(54) STORAGE MANAGEMENT SYSTEM

(71) Applicant: Hitachi, Ltd., Tokyo (JP)

(72) Inventors: Junichi Hara, Tokyo (JP); Takuya Okamoto, Tokyo (JP); Takato Kusama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/374,431

(22) PCT Filed: Dec. 10, 2013

(86) PCT No.: PCT/JP2013/083080
§ 371 (c)(1),
(2) Date: Jul. 24, 2014

(65) Prior Publication Data
US 2015/0160885 A1 Jun. 11, 2015

(51) Int. Cl.
*G06F 3/00* (2006.01)
*G06F 12/00* (2006.01)
*G06F 3/06* (2006.01)
*H04L 29/12* (2006.01)
*H04L 29/06* (2006.01)

(52) U.S. Cl.
CPC ............ *G06F 3/0647* (2013.01); *G06F 3/0608* (2013.01); *G06F 3/0683* (2013.01); *H04L 61/10* (2013.01); *H04L 65/601* (2013.01)

(58) Field of Classification Search
CPC .............................. H04L 61/10; H04L 65/601
See application file for complete search history.

(56) References Cited

U.S. PATENT DOCUMENTS

| | | | |
|---|---|---|---|
| 7,395,396 B2* | 7/2008 | Takahashi et al. | 711/165 |
| 7,590,671 B2* | 9/2009 | Achiwa | 707/822 |
| 2007/0055715 A1* | 3/2007 | Achiwa | 707/204 |
| 2008/0082748 A1 | 4/2008 | Liu et al. | |
| 2010/0061184 A1* | 3/2010 | Winbow | 367/73 |
| 2011/0246740 A1* | 10/2011 | Yata et al. | 711/165 |
| 2012/0011336 A1* | 1/2012 | Saika | 711/162 |
| 2012/0311260 A1 | 12/2012 | Yamagiwa et al. | |
| 2014/0143514 A1* | 5/2014 | Kulkarni et al. | 711/162 |

FOREIGN PATENT DOCUMENTS

| | | | |
|---|---|---|---|
| JP | 2011-221660 A | 4/2011 | |
| WO | 2012/164714 A1 | 12/2012 | |

OTHER PUBLICATIONS

International Search Report and Written Opinion, International application No. PCT/JP2013/083080, dated Feb. 25, 2014.

* cited by examiner

*Primary Examiner* — Hyun Nam
(74) *Attorney, Agent, or Firm* — Volpe and Koenig, P.C.

(57) ABSTRACT

The storage management system supports planning of volume migration between different storage apparatuses. The storage management system determines source volume groups to which the source volumes belong, determines sizes of volumes to be allocated from the storage device groups to the destination pools, determines sizes of volumes to be migrated from the source volume groups to the destination pools, creates image data indicating information on the determined sizes of volumes to be allocated and the sizes of volumes to be migrated, and outputs the image data to a display device.

11 Claims, 23 Drawing Sheets

| RAID GROUP MANAGEMENT TABLE 245 ||||||||
|---|---|---|---|---|---|---|---|
| STORAGE APPARATUS ID | RAID GROUP ID | RAID GROUP CAPACITY [GB] | RAID GROUP PERFORMANCE [IOPS/GB] | RAID TYPE | STORAGE MEDIA TYPE | STORAGE DEVICE PERFORMANCE [IOPS/GB] | STORAGE DEVICE ID |
| Str_A | RG_0 | 100 | 50K | RAID5 | SSD(SLC) | 50K | Dev_0 |
|  |  |  |  |  |  |  | Dev_1 |
|  |  |  |  |  |  |  | Dev_2 |
|  | RG_1 | 200 | 20K | RAID1 | SSD(MLC) | 20K | Dev_3 |
|  |  |  |  |  |  |  | Dev_4 |
|  | : | : | : | : | : |  | : |
| Str_B | RG_0 | 500 | 10K | RAID5 | HDD(SAS) | 10K | Dev_0 |
|  |  |  |  |  |  |  | Dev_1 |
|  |  |  |  |  |  |  | Dev_2 |
|  | : | : | : | : | : |  | : |
| : | : | : | : | : | : |  | : |

*Fig. 5*

| LOGICAL VOLUME MANAGEMENT TABLE 243 |||||||
|---|---|---|---|---|---|---|
| STORAGE APPARATUS ID | LOGICAL VOLUME ID | LOGICAL VOLUME CAPACITY [GB] | LOGICAL VOLUME PERFORMANCE [IOPS/GB] | ASSIGNED HOST | ASSIGNED POOL | RAID GROUP ID |
| Str_A | LVol_0 | 10 | 50K | Host_Y | - | RG_0 |
|  | LVol_1 | 10 | 20K | - | Pool_0 | RG_0 |
|  | LVol_2 | 20 | 10K | - | - | RG_0 |
|  | : | : | : | : | : | : |
| Str_B | LVol_0 | 10 | 10K | - | - | RG_2 |
|  | LVol_1 | 20 | 20K | - | - | RG_2 |
|  | : | : | : | : | : | : |
| : | : | : | : | : | : | : |

*Fig. 6*

| POOL MANAGEMENT TABLE 244 | | | | |
|---|---|---|---|---|
| STORAGE APPARATUS ID | POOL ID | POOL CAPACITY [GB] | POOL PERFORMANCE [IOPS/GB] | LOGICAL VOLUME ID |
| Str_A | Pool_0 | 200 | 15K | LVol_0 |
| | | | | LVol_3 |
| | | | | LVol_6 |
| | Pool_1 | 300 | 10K | LVol_1 |
| | | | | LVol_5 |
| | : | : | : | : |
| Str_B | Pool_0 | 100 | 7K | LVol_0 |
| | | | | LVol_1 |
| | : | : | : | : |
| : | : | : | : | : |

*Fig. 7*

| VIRTUAL VOLUME MANAGEMENT TABLE 242 | | | | | | |
|---|---|---|---|---|---|---|
| STORAGE APPARATUS ID | VIRTUAL VOLUME ID | VIRTUAL VOLUME MAXIMUM SIZE [GB] | VIRTUAL VOLUME ACTUAL SIZE IN USE [GB] | VIRTUAL VOLUME PERFORMANCE [IOPS/GB] | ASSIGNED HOST | POOL ID |
| Str_A | VVol_0 | 20 | 10 | 20K | Host_A | Pool_0 |
| | VVol_1 | 100 | 40 | 20K | - | Pool_1 |
| | : | : | : | : | : | : |
| Str_B | VVol_0 | 200 | 10 | 30K | Host_C | Pool_0 |
| | VVol_1 | 100 | 50 | 20K | Host_D | Pool_1 |
| | : | : | : | : | : | : |
| : | : | : | : | : | : | : |

*Fig. 8*

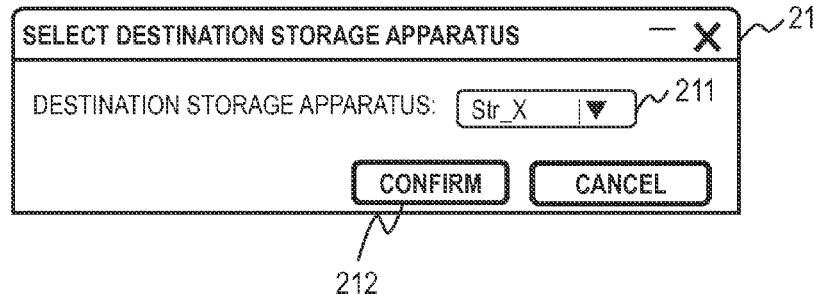
Fig. 9
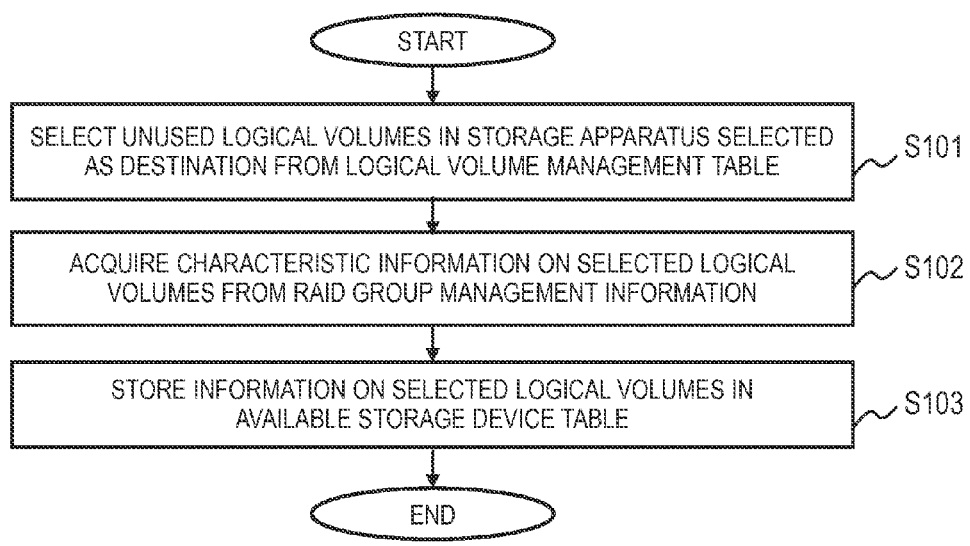
Fig. 10
Fig. 11

DESTINATION POOL CONFIGURATION TEMPORARY INFORMATION TABLE 248

| STORAGE APPARATUS ID | POOL ID | POOL CAPACITY [GB] | POOL PERFORMANCE [IOPS/GB] | LOGICAL VOLUME ID | LOGICAL VOLUME CAPACITY [GB] | LOGICAL VOLUME PERFORMANCE [IOPS/GB] | STORAGE MEDIA TYPE |
|---|---|---|---|---|---|---|---|
| Str_X | Pool_1 | 260 | 27K | LVol_0 | 60 | 50K | SSD(SLC) |
| | | | | LVol_5 | 100 | 20K | SSD(MLC) |
| | | | | LVol_6 | 100 | 20K | SSD(MLC) |
| | Pool_2 | 800 | 14K | LVol_7 | 300 | 20K | SSD(MLC) |
| | | | | LVol_8 | 500 | 10K | HDD(SAS) |
| | Pool_3 | 1100 | 10K | LVol_9 | 1100 | 10K | HDD(SAS) |

*Fig. 17*

| SOURCE VOLUME PERFORMANCE CLASS TABLE 246 | | |
|---|---|---|
| PERFORMANCE CLASS ID | HIGHEST PERFORMANCE [IOPS/GB] | LOWEST PERFORMANCE [IOPS/GB] |
| Perf_0 | - | 41K |
| Perf_1 | 41K | 33K |
| Perf_2 | 33K | 22K |
| Perf_3 | 22K | 21K |
| Perf_4 | 17K | 15K |
| Perf_5 | 15K | 12K |
| Perf_6 | 12K | 11K |
| Perf_7 | 11K | 8K |
| Perf_8 | 8K | 0K |

Fig. 20

| PERFORMANCE INCREASE/DECREASE INDICATION BOUNDARY TABLE 292 |
|---|
| BOUNDARY VALUE [%] |
| +50 |
| +20 |
| -20 |

Fig. 21

CHANGE INCREASE/DECREASE INDICATION ~73

- INCREASE — 50% OR MORE 50% OR MORE
- INCREASE — 20% OR MORE AND LESS THAN 50%
- INCREASE/DECREASE — LESS THAN 20%
- DECREASE — 20% OR MORE

731
[CONFIRM] [CANCEL]

Fig. 22

ADD SOURCE VOLUME
SOURCE STORAGE APPARATUS : Str_A
| | VIRTUAL VOLUME | IOPS/GB | MAXIMUM SIZE | ACTUAL SIZE IN USE | ASSIGNED HOST |
|---|---|---|---|---|---|
| ☑ | VVol_1 | 20000 | 10 | 5 | Host_B |
| ☑ | VVol_2 | 20000 | 20 | 10 | Host_B |
| ☑ | VVol_3 | 20000 | 20 | 15 | Host_C |
| ☐ | VVol_4 | 20000 | 10 | 5 | Host_C |
| ☐ | VVol_5 | 20000 | 50 | 40 | Host_D |
| ☐ | VVol_6 | 20000 | 40 | 30 | Host_D |
721 — CONFIRM   CANCEL
*Fig. 24*
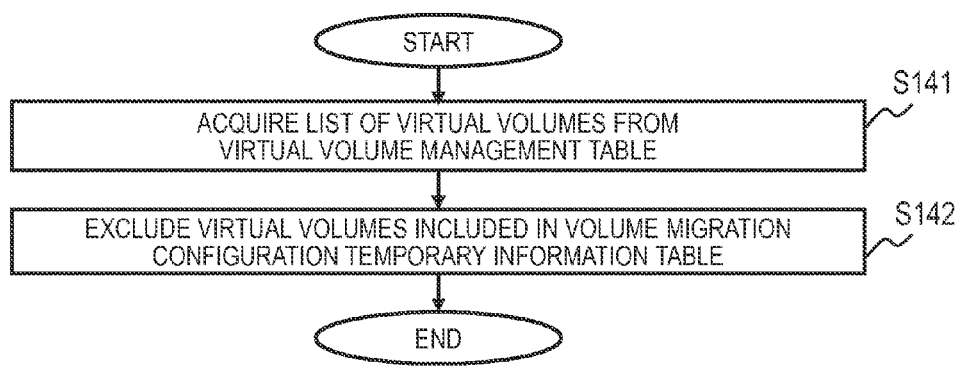
*Fig. 25*
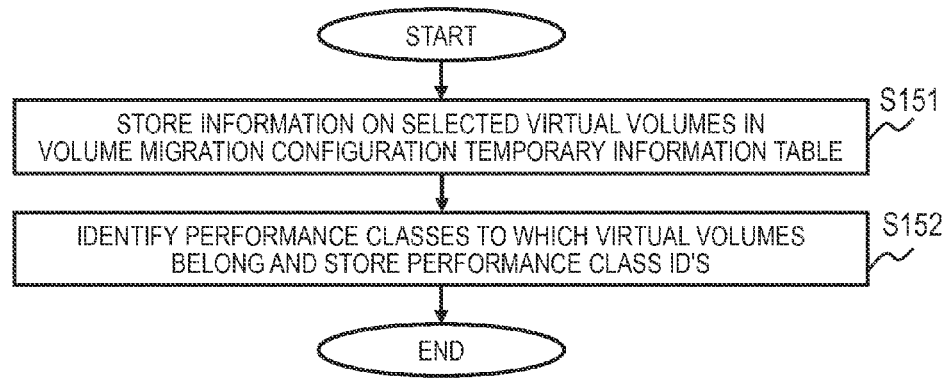
*Fig. 26*

VOLUME MIGRATION CONFIGURATION TEMPORARY INFORMATION TABLE 249

| STORAGE APPARATUS ID | SOURCE VOLUME | | | | | | | DESTINATION POOL | | | |
|---|---|---|---|---|---|---|---|---|---|---|---|
| | VIRTUAL VOLUME ID | VIRTUAL VOLUME MAXIMUM SIZE [GB] | VIRTUAL VOLUME ACTUAL SIZE IN USE [GB] | VIRTUAL VOLUME PERFORMANCE [IOPS/GB] | ASSIGNED HOST | PERFORMANCE CLASS ID | STORAGE APPARATUS ID | POOL ID | POOL PERFORMANCE [IOPS/GB] | ESTIMATED PERFORMANCE INCREASE/ DECREASE |
| Str_A | VVol_0 | 20 | 10 | 30K | Host_A | Perf_2 | Str_X | - | - | - |
| | VVol_1 | 20 | 20 | 30K | Host_B | Perf_2 | | - | - | - |
| | VVol_2 | 30 | 20 | 30K | Host_C | Perf_2 | | - | - | - |
| | ... | ... | ... | ... | ... | ... | | ... | ... | ... |

Fig. 27

VOLUME MIGRATION CONFIGURATION TEMPORARY INFORMATION TABLE 249

| STORAGE APPARATUS ID | SOURCE VOLUME | | | | | | | DESTINATION POOL | | |
|---|---|---|---|---|---|---|---|---|---|---|
| | VIRTUAL VOLUME ID | VIRTUAL VOLUME MAXIMUM SIZE [GB] | VIRTUAL VOLUME ACTUAL SIZE IN USE [GB] | VIRTUAL VOLUME PERFORMANCE [IOPS/GB] | ASSIGNED HOST | PERFORMANCE CLASS ID | STORAGE APPARATUS ID | POOL ID | POOL PERFORMANCE [IOPS/GB] | ESTIMATED PERFORMANCE INCREASE/ DECREASE |
| Str_A | VVol_0 | 20 | 10 | 30K | Host_A | Perf_2 | Str_X | Pool_1 | 27K | -11% |
| | VVol_1 | 20 | 20 | 30K | Host_B | Perf_2 | | Pool_1 | 27K | -11% |
| | VVol_2 | 30 | 20 | 30K | Host_C | Perf_2 | | Pool_1 | 27K | -11% |
| | .. | .. | .. | .. | .. | .. | | .. | .. | .. |

*Fig. 32*

STORAGE MANAGEMENT SYSTEM

BACKGROUND

This invention relates to management of volume migration between storage apparatuses.

The background of this application includes Patent Literature 1. The volumes belonging to storage devices A to D are virtually managed as a consolidation. A host recognizes the plurality of storage devices A to D as a single virtual storage device. The user can discretionally group the volumes of the storage system into storage layers 1 to 3. For example, the storage layer 1 may be defined as a highly reliable layer, the storage layer 2 as a low-cost layer, and the storage layer 3 as an archive layer. When the user designates volumes V1 and V2 to be migrated on a group basis together with the destination storage layer, data is relocated.

Patent Literature 1: U.S. Pat. No. 7,395,396

SUMMARY

In the case of volume migration between different models, for example, from a storage apparatus of an old model to a storage apparatus of a new model, storage media mounted in the source storage apparatus and the destination storage apparatus are different in the type, capacity, and performance capability. Accordingly, the storage administrator newly configures volumes and pools in the destination storage apparatus. The storage administrator should pay attention to the difference in performance capability of the volumes before and after the migration in determining the configuration of the destination storage apparatus.

The volume performance in the destination storage apparatus depends on the performance of the pool in the destination storage apparatus to which the migrated volume belongs. The performance of a pool depends on the sizes of storage areas provided by storage devices and the performance of the storage devices.

Traditional storage management systems, however, perform displaying information on pool configuration in the destination storage apparatus and configuring pools separately from displaying information on destination in volume migration and configuring volume migration. Accordingly, the storage administrator cannot efficiently pursue planning of volume migration that satisfies desired performance requirements.

An aspect of this invention is a storage management system for managing source storage apparatuses including source volumes and a destination storage apparatus to which the source volumes are migrated, the storage management system including a processor and a memory device. The memory device holds: volume management information including information on owner apparatuses and characteristics of the source volumes; destination pool configuration management information including sizes of volumes to be allocated from storage device groups in the destination storage apparatus to destination pools; and volume migration configuration management information including information on relations between the source volumes and the destination pools. The processor determines source volume groups to which the source volumes belong based on the volume management information. The processor determines sizes of volumes to be allocated from the storage device groups to the destination pools based on the destination pool configuration management information. The processor determines sizes of volumes to be migrated from the source volume groups to the destination pools based on the volume migration configuration management information. The processor creates image data indicating information on the determined sizes of volumes to be allocated and the sizes of volumes to be migrated. The processor outputs the image data to a display device.

An aspect of this invention provides appropriate support to the storage administrator in planning of volume migration between different storage apparatuses.

BRIEF DESCRIPTION OF THE DRAWINGS

FIG. 5 illustrates a configuration example of a RAID group management table in the management computer;

FIG. 6 illustrates a configuration example of a logical volume management table in the management computer;

FIG. 7 illustrates a configuration example of a pool management table in the management computer;

FIG. 8 illustrates a configuration example of a virtual volume management table in the management computer;

FIG. 9 illustrates an example of a Select Destination Storage Apparatus window to appear first after start-up of a volume migration GUI;

FIG. 10 illustrates a configuration example of an available storage device table in the management computer;

FIG. 11 is a flowchart illustrating processing to create or update the available storage device table;

FIG. 17 illustrates an example of a destination pool configuration temporary information table;

FIG. 20 illustrates an example of a source volume performance class table;

FIG. 21 illustrates an example of a performance increase/decrease indication boundary value table;

FIG. 22 illustrates an example of a Change Increase/Decrease Indication window created and displayed by the GUI display control program in response to press of a Change Increase/Decrease Indication button in the migration configuration window;

FIG. 24 illustrates an example of an Add Source Volume window created and displayed by the GUI display control program in response to press of an Add Source Volume button in the migration configuration window;

FIG. 25 is a flowchart of processing of the GUI display control program to create a list of volumes to be displayed in the Add Source Volume window;

FIG. 26 is a flowchart of processing of the GUI display control program performed in response to press of a Confirm button in the Add Source Volume window;

FIG. 27 illustrates a configuration example of a volume migration configuration temporary information table;

FIG. 32 illustrates the volume migration configuration temporary information table after destination pools have been specified for source volumes;

DETAILED DESCRIPTION OF THE EMBODIMENTS

Hereinafter, an embodiment of this invention is described with reference to the accompanying drawings. It should be noted that the embodiment is merely an example to realize this invention and is not to limit the technical scope of this invention. Throughout the drawings, elements common to some drawings are denoted by the same reference signs unless particularly mentioned.

This embodiment discloses a system and a method for supporting planning of volume migration between storage systems. This system indicates the sizes of volumes allocated from each storage device group to destination pools and the sizes of volumes to be migrated from each storage device group to destination pools in the same window. As a result, the storage administrator can grasp the pool configuration in a destination storage apparatus and the relationship between volumes and destination pools through the image on the display, achieving effective planning in view of volume performance before and after the migration.

The system of this embodiment categorizes source volumes into groups and indicates the sizes of volumes to be migrated from the source volume groups to destination pools. Further, it categorizes the storage devices in the destination storage apparatus into groups and indicates the sizes of volumes allocated from the storage device groups to the destination pools. As a result, the storage administrator can easily grasp the overall storage system even if a large number of source volumes and destination storage devices exist.

The system of this embodiment further accepts instructions specifying the sizes of volumes to be allocated to the destination pools and the sizes of volumes to be migrated to the destination pools with the image on the display. As a result, the storage administrator can determine the configuration of destination pools and the destinations of volumes to be migrated while overviewing both of the source storage apparatuses and the destination storage apparatus.

Figure 1:
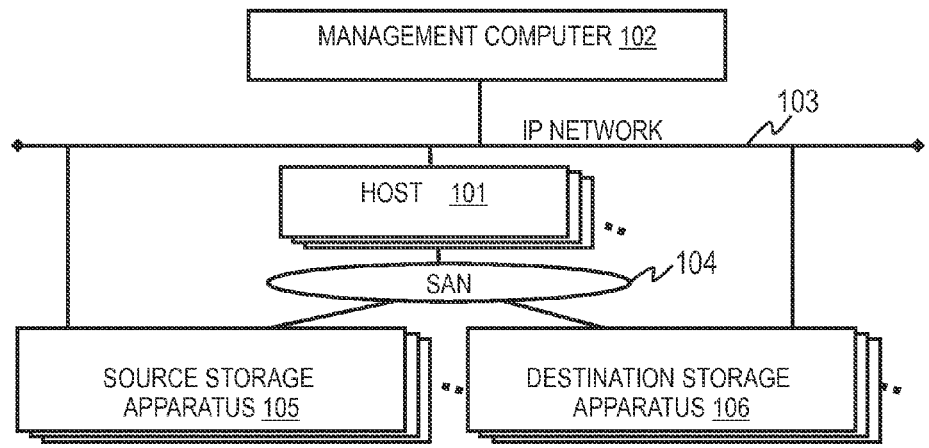
FIG. 1 is a block diagram schematically illustrating a general configuration of a computer system.

FIG. 1 is a block diagram schematically illustrating a general configuration of a computer system in this embodiment. The computer system includes a host apparatus (hereinafter, occasionally referred to as host), a management computer 102, a plurality of source storage apparatuses 105, and a plurality of destination storage apparatuses 106. The numbers of host apparatuses, management computers, and storage apparatuses each depend on the design.

The host apparatus 101, the management computer 102, and the storage apparatuses 105 and 106 are connected to be able to communicate with one another via a management network 103. In an example, the management network 103 is an IP network. The management network 103 may also be a network other than the IP network as far as it is a network for data communication.

The host apparatus 101 and the storage apparatuses 105 and 106 are connected via a data network 104. The host apparatus 101 is an apparatus that accesses the resources of the storage apparatuses 105 and 106 to provide services. The data network 104 is a network for data communication; in an example, it may be a SAN (Storage Area Network). The data network 104 may be a network other than the SAN as far as it is a network for data communication. The data network 104 and the management network 103 may be the same network.

Figure 2:
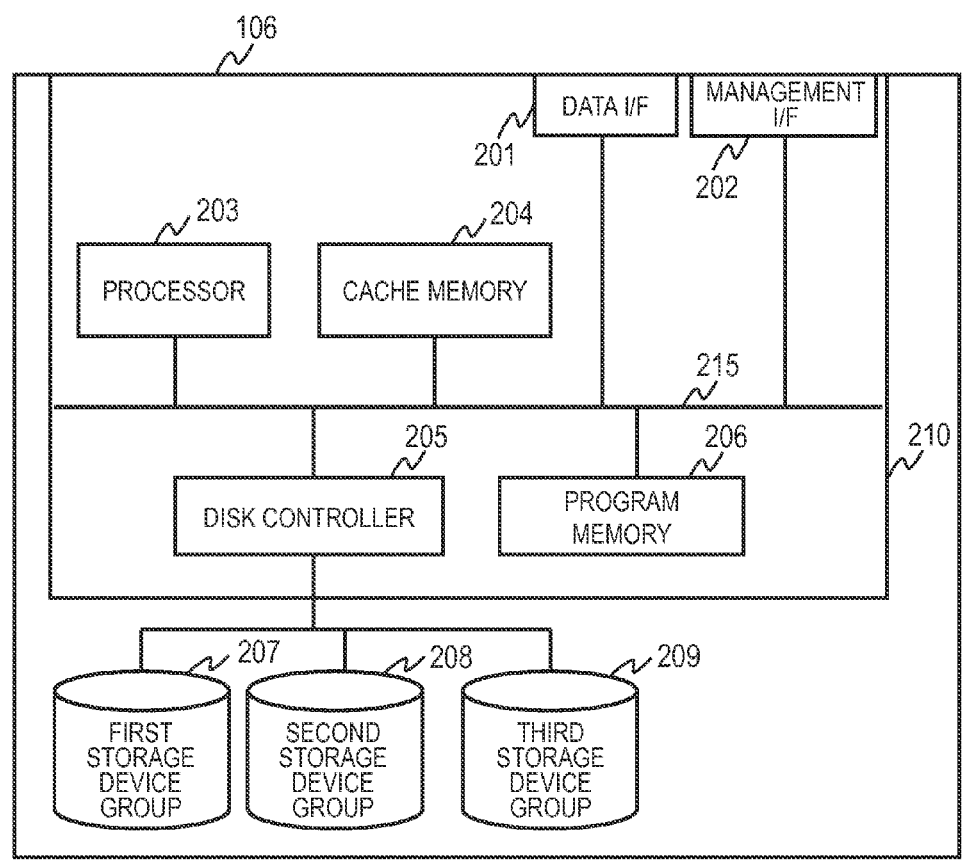
FIG. 2 illustrates an example of hardware configuration of a storage apparatus.

The storage apparatuses 105 and 106 have different specifications but can have the same basic configuration. Accordingly, a configuration example of the storage apparatus 106 is specifically described hereinafter. FIG. 2 illustrates an example of the hardware configuration of the storage apparatus 106.

The storage apparatus 106 includes a first storage device group 207, a second storage device group 208, a third storage device group 209, and a controller 210. For example, the first storage device group 207, the second storage device group 208, and the third storage device group 209 are an SLC SSD (Single Level Cell Solid State Drive) group, an MLC SSD (Multi Level Cell Solid State Drive) group, and a SAS HDD (Serial Attached SCSI Hard Disk Drive) group, respectively. The source storage apparatus 105 may have only a single type of storage devices.

The controller 210 includes a processor 203, a program memory 206, a cache memory 204, a disk controller 205, a data interface 201, and a management interface 202. These are connected to be able to communicate with one another via an internal bus 215.

The processor 203 (controller 210) executes a storage control program and other necessary programs to implement predetermined functions including control of I/Os from the host apparatus 101 and management and control of pools and volumes in the storage apparatus 106. The program memory 206 stores programs executed by the processor 203 and data therefore.

The cache memory 204 temporarily stores user data of the host apparatus 101. Specifically, it temporarily stores write data from the host apparatus 101 and then transfers it to one of the storage device groups 207 to 209. It also temporarily stores read data to be transferred from one of the storage device groups 207 to 209 to the host apparatus 101.

The disk controller 205 has a function to convert a protocol used for communication between the storage device groups 207 to 209 and the controller 210 into a protocol used inside the storage controller 210. The data interface 201 and the management interface 202 are connected to the data network 104 and the management network 103, respectively, and have functions to convert the respective protocols used for communication in the networks to a protocol used inside the controller 201.

Figure 3:
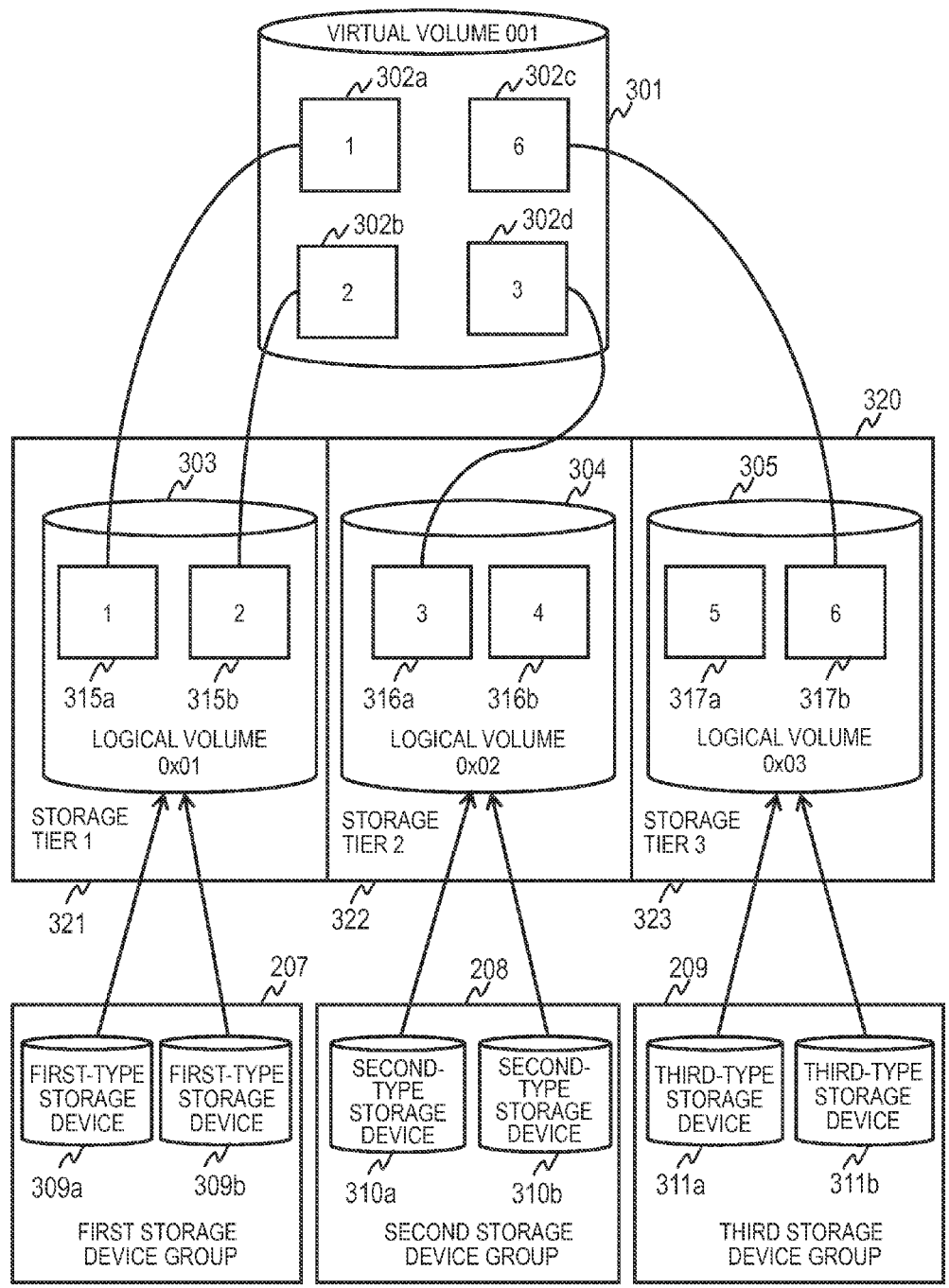
FIG. 3 schematically illustrates an example of logical configuration of volumes a destination storage apparatus provides to a host apparatus and an example of relations among volumes and storage device groups.

FIG. 3 schematically illustrates an example of logical configuration of volumes the destination storage apparatus 106 provides to the host apparatus 101 and an example of relationship among the volumes and the storage device groups 207 to 209. The source storage apparatus 105 may provide pools and virtual volumes or alternatively, may provide only normal logical volumes.

The controller 210 configures a pool 320 that consists of a plurality of unit storage areas (pages). In the example of FIG. 3, the pool 320 consists of a plurality of logical volumes (real volumes) and each logical volume consists of a plurality of pages. The controller 210 can create a plurality of pools. The controller 210 creates a virtual volume 301 that is allocated storage areas (pages) in the pool 320. The virtual volume 301 is provided to the host apparatus 101.

The pool is hierarchically tiered into a plurality of storage tiers, which may be different in access performance capability. In this example, the pool 320 consists of three storage tiers 321 to 323. The storage tier 1 (321) has the highest access performance capability and the storage tier 3 (323) has the lowest. In this example, the storage tiers 321 to 323 include logical volumes 303 to 305, respectively, by way of example. The storage tiers 321 to 323 each include one or more logical volumes.

The storage device groups 207 to 209 provide storage areas for the storage tiers 321 to 323, respectively. The first storage device group 207 is composed of a first type of storage devices; FIG. 3 shows two first-type storage devices 309a and 309b, by way of example. The second storage device group 208 is composed of second type of storage devices; FIG. 3 shows two second-type storage devices 310a and 310b, by way of example. The third storage device group 209 is composed of third type of storage devices; FIG. 3 shows two third-type storage devices 311a and 311b, by way of example.

The three types of storage devices in the storage device groups 207 to 209 are different in access performance capability. In this example, the first type of storage devices has the highest performance capability and the third type of storage devices have the lowest performance capability. The access performance is expressed in indices such as response time and throughput. Typically, redundant arrays of inexpensive disks (RAID) composed of a plurality of storage devices provide a plurality of logical volumes.

The controller 210 configures logical volumes different in access performance capability from storage areas provided by the storage device groups 207 to 209. As mentioned above, the logical volume 303 composed of storage areas of the storage device group 207 has the highest access performance capability and the logical volume 305 composed of storage areas of the storage device group 209 has the lowest access performance capability.

In the pool 320, each volume is composed of a plurality of pages. Pages are unit storage areas to manage virtual volumes and pools. In the example of FIG. 3, the logical volume 303 includes pages 315a and 315b. The logical volume 304 includes pages 316a and 316b. The logical volume 305 includes pages 317a and 317b.

A volume provided to the host apparatus 101 is a virtual volume and its capacity is virtualized. Every time the virtual volume 301 is written by the host apparatus 101 to become in need of a data storage area, the controller 210 allocates a page to the virtual volume 301. In the example of FIG. 3, the virtual volume 301 includes virtual pages 302a to 302d.

The virtual pages 302a to 302d have been allocated logical pages (real pages): the virtual page 302a has been allocated the logical pages 315a in the logical volume 303 of the storage tier 1 (321); the virtual page 302b has been allocated the logical page 315b in the logical volume 303 of the storage tier 1 (321); the virtual page 302c has been allocated the logical page 317b in the logical volume 305 of the storage tier 3 (323); and the virtual page 302d has been allocated the logical page 316a in the logical volume 304 of the storage tier 2 (322).

The storage apparatus 106 can configure the capacity of the virtual volume 301 recognized by the host apparatus 101 larger than the real size (total size of all logical pages) allocated to the virtual volume 301.

In response to a write from the host apparatus 101 to an area in the virtual volume 301 which has not been allocated a page, the controller 210 newly allocates a logical page to the virtual volume 301. The controller 210 releases a logical page that has been allocated to the virtual volume 301 but does not hold user data.

In an example, in response to a write from the host apparatus 101 to the virtual volume 301, the controller 210 newly allocates a required size of page from the highest-class storage tier 1 (301) of the pool 320 to the virtual volume 301. The controller may determine the storage tier for the page to be written by a different method.

Figure 4:
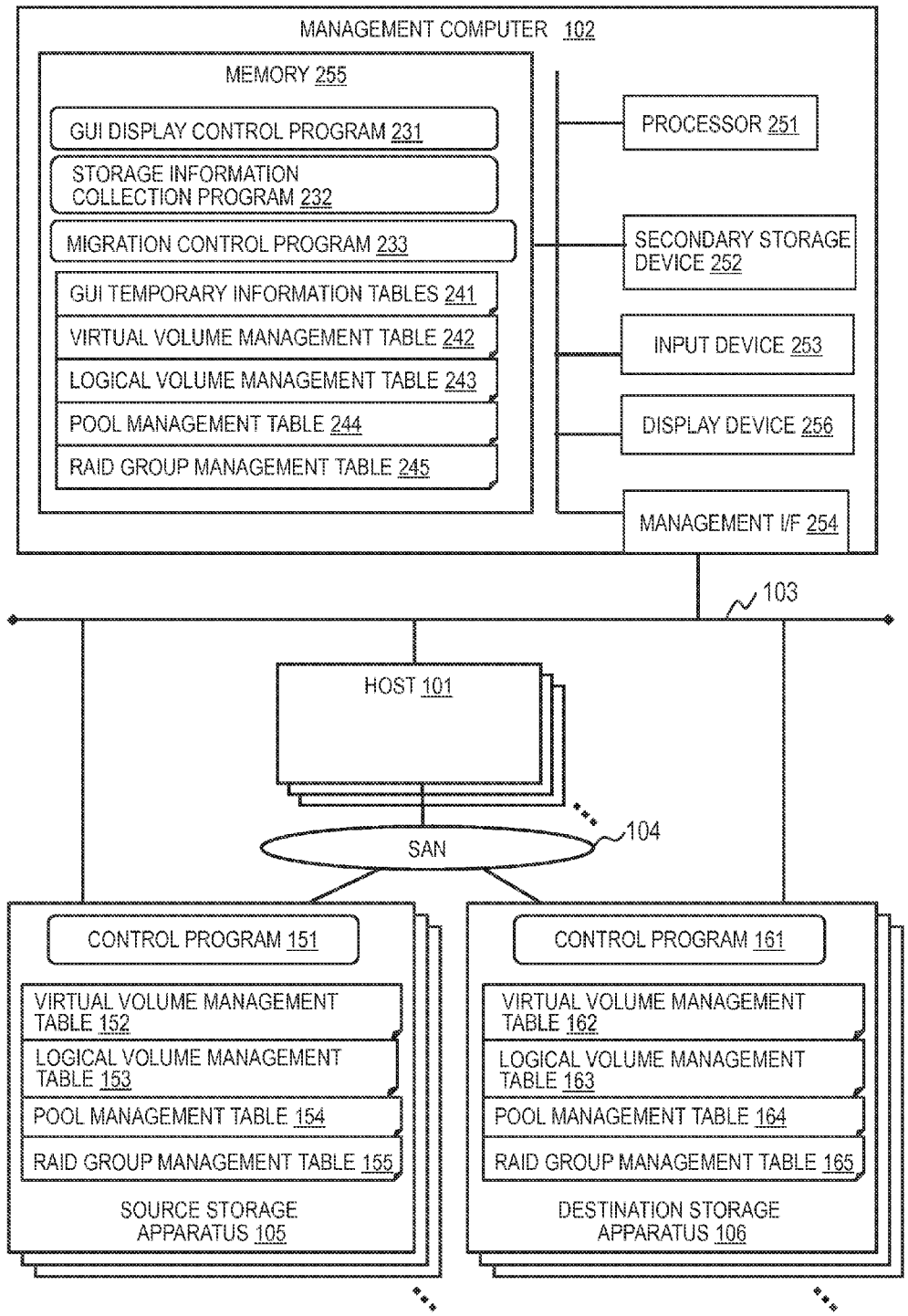
FIG. 4 illustrates an example of hardware configuration of a management computer and an example of software configuration of the computer system.

FIG. 4 illustrates an example of hardware configuration of the management computer 102 and an example of software configuration of the computer system. The management computer 102 includes a management interface 254, a processor 251, a memory 255 of a primary storage device, a secondary storage device 252, an input device 253, and a display device 256. The management computer 102 executes management software to work in accordance with it. The devices in the management computer 102 are connected via a bus to be able to communicate with one another.

The input device 253 includes one or more devices such as a pointer, a keyboard, and others. The administrator can operate the management computer 102 with these input devices 253 and the display device 256; alternatively, the administrator may access the management computer 102 from a client computer connected via a network 103. The client computer is included in the management system together with the management computer 102.

The administrator inputs necessary information with an input device 253 and checks the necessary information by sight with a display device 256. The management system may be configured with one or more computers; it may include a plurality of servers each having a part or all of the functions of the management computer 102.

The processor 251 executes programs held in the memory 255 to implement predetermined functions of the management computer 102. The memory 255 stores programs to be executed by the processor 251 and information required to execute the programs. The programs include not shown OS and other programs in addition to the management programs.

The management software includes a plurality of programs (modules) and information used by the programs. In this example, the management software includes a GUI display control program 231, a storage information collection program 232, and a migration control program 233. Furthermore, the management software includes GUI temporary information tables 241, a virtual volume management table 242, a logical volume management table 243, a pool management table 244, and a RAID group management table 245.

In typical, the management software is loaded from the secondary storage device 252 to the memory 255. The secondary storage device 252 is a storage device including a non-volatile non-transitory storage medium for storing information (including programs and data) required to implement predetermined functions of the management computer 102. The secondary storage device 252 may be an external storage device connected via a network.

The source storage apparatus 105 includes a control program 151, a virtual volume management table 152, a logical volume management table 153, a pool management table 154, and a RAID group management table 155. The destination storage apparatus 106 includes a control program 161, a virtual volume management table 162, a logical volume management table 163, a pool management table 164, and a RAID group management table 165.

The control programs 151 and 161 control the storage apparatuses 105 and 106, respectively, so that they perform necessary processing. In this embodiment, the control programs 151 and 161 send and receive necessary information to and from the management computer 102 and further, update management information and perform volume migration in accordance with instructions from the management computer 102.

The management computer 102 acquires necessary information from the storage administrator and the storage apparatuses 105 and 106 to create and update tables. The storage information collection program 232 collects necessary information from the source storage apparatus 105 and the destination storage apparatus 106 and updates tables. The GUI display control program 231 updates tables in accordance with information acquired from the storage administrator through the input device 253.

The tables 242 to 245 in the management computer 102 each have united information of the information in the tables having the identical names in the storage apparatuses 105 and 106. As will be described later, the tables 242 to 245 in the management computer 102 include the IDs of the storage apparatuses in addition to the information of the tables having the identical names in the storage apparatuses 105 and 106.

The programs are executed by a processor to perform predetermined processing. Accordingly, a description having a subject of program in this embodiment may be replaced by a description having a subject of processor. Alternatively, processing performed by a program is processing performed by the apparatus (such as the storage apparatus 105 or 106, the management computer 102, or the host apparatus 101) and the system which run the program.

The processor operates in accordance with a program to work as a functional part (means) to implement a predetermined function. Moreover, the processor also works as functional parts to implement different processing executed by each program. The apparatus and the system including the processor are an apparatus and a system including these functional parts (means).

In this embodiment, the information used by the system does not depend on the data structure and may be expressed in any data structure. For example, a data structure appropriately selected from table, list, database, and queue can store the information. In describing the information, terms such as identification information, identifier, name, ID, and number are used; these are replaceable with one another.

FIG. 5 is a configuration example of the RAID group management table 245 in the management computer 102. The RAID group management table 245 manages association relations between storage devices in the storage apparatuses 105 and 106 and RAID groups and characteristics of the RAID groups. The term "characteristics of a RAID group" inclusively represents the capacity and the I/O performance capability of the RAID group. In this embodiment, the I/O performance is expressed in [IOPS/GB], but the unit of measurement of performance is not limited to this.

The storage information collection program 232 collects information from the RAID group management tables 155 and 165 in the storage apparatuses 105 and 106 and stores it in the RAID group management table 245. The RAID group management tables 155 and 165 each manage only the local RAID groups of an apparatus. However, the RAID group management table 245 has a column for storing the IDs of storage apparatuses so as to manage information of a plurality of storage apparatuses.

The "RAID group performance" indicates an estimated I/O performance value of a logical volume cut out from a RAID group. In the example of FIG. 5, the RAID group performance is equal to the storage device performance of the storage devices constituting the RAID group. Unlike this, the RAID group performance value may be calculated by a function of a variable of the storage device performance. The control program 151 or 161 in the storage apparatus or the storage information collection program 232 calculates the RAID group performance with a formula equipped therewith beforehand.

In this example, the RAID group IDs are identifiers unique to a storage apparatus. A RAID group consists of a plurality of storage devices and the number of storage devices constituting a RAID group depends on the design. The "storage media type" of a RAID group is the same as the type of the storage devices constituting the RAID group. In this embodiment, a RAID group consists of the same storage media type of storage devices.

FIG. 6 illustrates a configuration example of the logical volume management table 243 in the management computer 102. The logical volume management table 243 manages association relations between logical volumes and their owner apparatuses and characteristics of the logical volumes.

The storage information collection program 232 collects information from the logical volume management tables 153 and 163 in the storage apparatuses 105 and 106 and stores it in the logical volume management table 243. The logical volume management tables 153 and 163 each manage only the local logical volumes of an apparatus. However, the logical volume management table 243 manages information of a plurality of storage apparatuses; accordingly, it includes a column for storing the IDs of the storage apparatuses.

The term of owner apparatus of a logical volume inclusively represents the storage apparatus providing the logical volume, the host apparatus that accesses the logical volume, and the RAID group from which the logical volume is cut out. The logical volume management table 243 further includes the pool to which the logical volume is allocated. If any value is contained in the column of "assigned host" or "assigned pool", the logical volume is in use.

The term of characteristics of a logical volume inclusively represents the capacity and the I/O performance capability ("logical volume performance") of the logical volume. The "logical volume performance" indicates the estimated I/O performance value of the logical volume. In the example of FIG. 6, the logical volume performance is equal to the RAID group performance of the RAID group from which the logical volume is cut out. Unlike this, the logical volume performance may be calculated by a function of a variable of the storage device performance. The control program 151 or 161 in the storage apparatus or the storage information collection program 232 calculates the logical volume performance with a formula equipped therewith beforehand.

FIG. 7 illustrates a configuration example of the pool management table 244 in the management computer 102. The pool management table 244 manages characteristics of pools and association relations between pools and logical volumes allocated to the pools.

The storage information collection program 232 collects information from the pool management tables 154 and 164 in the storage apparatuses 105 and 106 and stores it in the pool management table 244. The pool management tables 154 and 164 each manage only the local pools of an apparatus. However, the pool management table 243 manages information of a plurality of storage apparatuses; accordingly, it includes a column for storing the IDs of the storage apparatuses.

The term of characteristics of a pool inclusively represents the capacity and the I/O performance capability ("pool performance") of the pool. The "pool performance" indicates an estimated I/O performance value of a virtual volume cut out from the pool. The control program 151 or 161 in the storage apparatus or the storage information collection program 232 calculates the value with a formula equipped therewith beforehand and stores the calculated value in the column of the "pool performance".

Various formulae can be considered to calculate the pool performance. For example, the following formula may be used: Pool performance=$\Sigma$(Performance of a logical volume of the pool×Capacity of the same logical volume÷Capacity of the pool). In this formula, $\Sigma$ represents the sum for all the logical volumes constituting the pool.

FIG. 8 illustrates a configuration example of the virtual volume management table 242 in the management computer 102. The virtual volume management table 242 manages association relations between virtual volumes and owner apparatuses, association relations between virtual volumes and pools the virtual volumes belong to, and characteristics of the virtual volumes. In this example, a source volume in migration is a virtual volume; however, the source volume may be a logical volume.

The storage information collection program 232 collects information from the virtual volume management tables 152 and 162 in the storage apparatuses 105 and 106 and stores it in the virtual volume management table 242. The virtual volume management tables 152 and 162 each manage only the local virtual volumes of an apparatus. However, the virtual volume management table 242 manages information of a plurality of storage apparatuses; accordingly, it includes a column for storing the IDs of the storage apparatuses.

The term of owner apparatus of a virtual volume inclusively represents the storage apparatus providing the virtual volume and the host apparatus that accesses the virtual volume. The term of characteristics of a virtual volume inclusively represents the maximum size, the actual size in use, and the performance capability ("virtual volume performance") of the virtual volume.

The "virtual volume performance" indicates an estimated performance value of a virtual volume. In the example of FIG. 8, the virtual volume performance is equal to the pool performance of the pool from which the virtual volume is cut out. Unlike this, it may be calculated with a formula held by the control program 151 or 161 in the storage apparatus or the storage information collection program 232 beforehand or alternatively, an actual measured value may be stored.

Hereinafter, configuring volume migration with the management computer 102 is described. The storage administrator can select a destination storage apparatus 106 and specify a pool configuration in the destination storage apparatus 106 with the management computer 102. Further, the storage administrator can specify source volumes and destination pools of the source volumes with the management computer 102.

Figure 33:
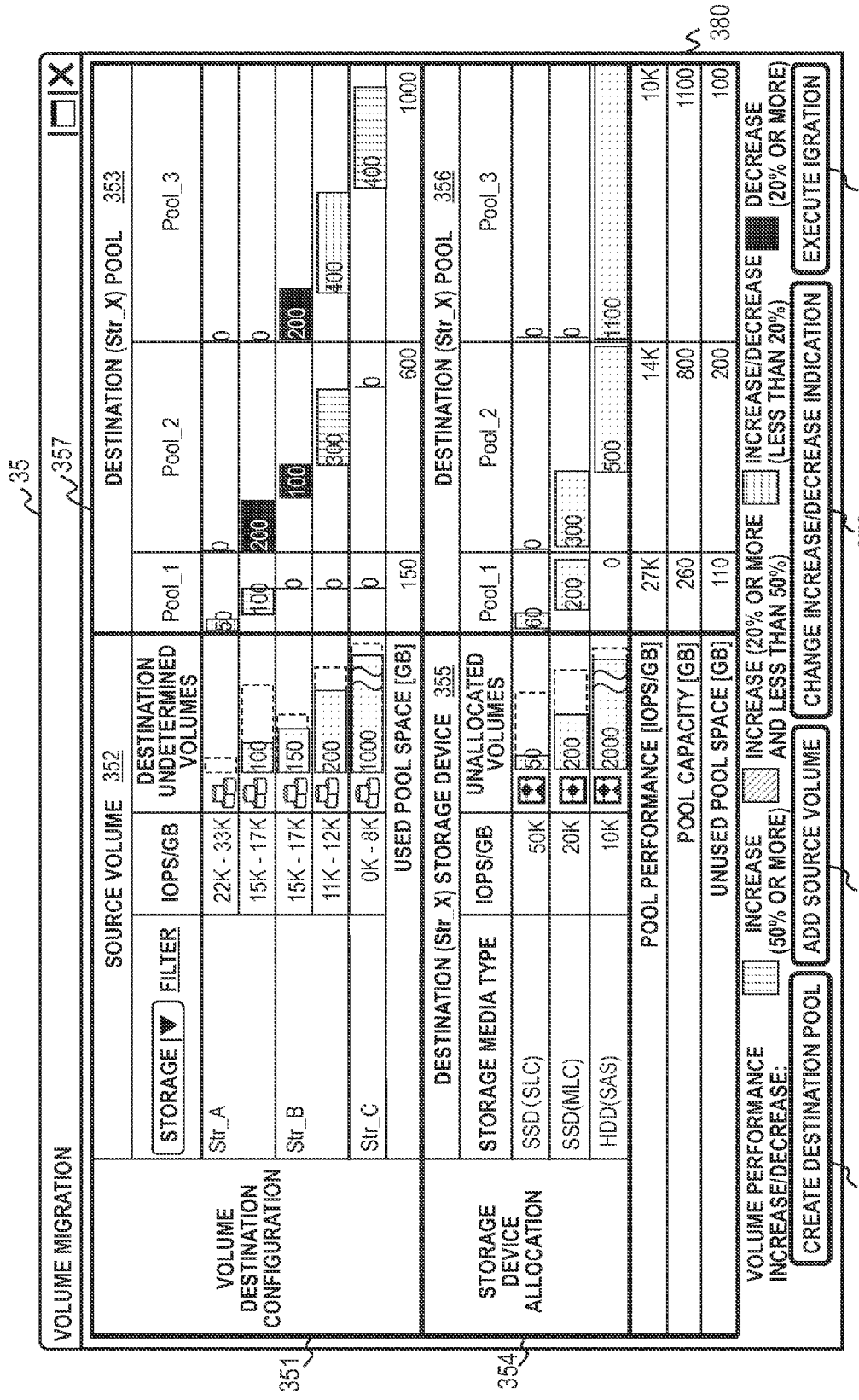
FIG. 33 illustrates the migration configuration window after destination pools have been specified.

First, an example of a configuration result is described. FIG. 33 illustrates an example of an image indicating a result of configuration of volume migration in this embodiment. The GUI display control program 231 creates image data of this image. This example is to migrate volumes from three source storage apparatuses Str_A, Str_B, and Str_C to one destination storage apparatus Str_X.

The source volumes are logical volumes or virtual volumes. The storage administrator configures migration of all or a part of the volumes in the three source storage apparatuses Str_A, Str_B, and Str_C. Migration of all volumes in one storage apparatus is also called storage apparatus migration.

In this example, the management computer 102 uses the same GUI image to receive inputs of configuration data as well as to display a configuration result. The management computer 102 may display an image showing a configuration result different from an image for receiving configuration data. A migration configuration window 35 includes a Create Destination Pool button 371, an Add Source Volume button 372, a Change Increase/Decrease Indication button 373, and an Execute Migration button 374; details of these buttons will be described later.

The migration configuration window 35 includes a volume destination configuration section 351 and a storage device allocation section 354. The volume destination configuration section 351 includes a source volume section 352 and a destination pool section 353. The storage device allocation section 354 includes a destination storage device section 355 and destination pool section 356.

The migration configuration window 35 includes a section 357. The section 357 includes destination pool sections 353 and 356, and a pool characteristics section 380. In this embodiment, a section included in a section is also called a subsection.

The volume destination configuration section 351 indicates relations between source volume groups (source volumes) and destination pools. Each row indicates information on one source volume group. A source volume group consists of one or more source volumes. Indicating information on each source volume group instead of each source volume allows the storage administrator to easily grasp the entirety of the destination pools and the source volumes.

The source volume section 352 indicates the source storage apparatus to which the source volume group belongs, I/O performance capability of the source volume group, and the volume size for which destination pools have not been determined (the size of destination undetermined volumes) for each source volume group. The I/O performance capability will be described later. The volume size represents a total size of source volumes.

In this example, the source volume groups are formed depending on the storage apparatus including the source volume and the I/O performance. That is to say, source volumes belonging to the same storage apparatus and the same I/O performance class belong to the same source volume group. Categorizing the source volumes into groups depending on the I/O performance enables clear indication of changes in I/O performance between before and after volume migration. The performance class of source volumes will be described later.

The size of destination undetermined volumes is indicated, in each cell, with a numerical value and a horizontal bar having a length corresponding to the numerical value. The broken line indicates the total volume size of the source volume group. For example, as to the source volume group having an I/O performance capability of "15K-17K" in the storage apparatus Str_A, the size of destination undetermined volumes is 100 GB.

The destination pool section 353 indicates the sizes of volumes to be migrated from each source volume group to individual pools. In this example, three pools Pool_1, Pool_2, and Pool_3 are prepared and each column indicates information on a pool.

A cell for a source volume group in a column of a pool indicates the size of volumes to be migrated from the source volume group to this pool. The cell indicates the size of volumes to be migrated with a numerical value and a horizontal bar having a length corresponding to the numerical value. For example, the sizes of volumes to be migrated from the source volume group having an I/O performance capability of 15K-17K in the storage apparatus Str_A to the pools Pool_1, Pool_2, and Pool_3 are 100 GB, 200 GB, and 0 GB, respectively.

A pool column has a width corresponding to the capacity of the pool. The relationship between the capacity of the pool and the width of the pool column applies to the relationship between the size of volumes to be migrated to the pool and the length of the horizontal bar. In each pool column, the horizontal bars representing the sizes of volumes to be migrated are disposed so as not to overlap in the row direction and correspond to a single bar in a stacked bar graph. Indicating the pool capacity of a pool and the sizes of volumes to be migrated to the pool in such a stacked bar graph enables the storage administrator to easily understand their relations.

The destination pool section 353 indicates the size of used space of each pool in the bottom row. The size of the used space is equal to the total size of volumes to be migrated. The used space of each pool may be indicated with a horizontal bar like the size of volumes to be migrated.

In the destination pool section 353, the horizontal bars representing the volumes to be migrated have graphic patterns corresponding to the rates of increase or decrease in volume performance. The storage administrator can easily note the changes in performance between before and after volume migration to determine the destinations in accordance with the changes.

In this example, the increase/decrease rate in volume performance is classified into four ranges: increase by 50% or more, increase by 20% or more and less than 50%, increase/decrease by less than 20%, and decrease by 20% or more. The performance increase/decrease indication ranges are defined beforehand or defined by inputs of the storage administrator. The increase or decrease in performance between before and after migration can be calculated from the I/O performance of the source volume group and the I/O performance of the destination pool. The performance classes for source volume groups are determined depending on the performance increase/decrease indication ranges. These will be described later.

The storage device allocation section 354 indicates information on characteristics of each storage device group in the destination storage apparatus and the volume size allocated from each storage device group to individual pools. A row indicates information on a storage device group.

In this example, the storage devices groups are formed based on the storage media type and the I/O performance. That is to say, storage devices of the same storage media type and having the same I/O performance capability belong to the same storage device group. In this example, each storage device group corresponds to each tier of the pools. Multiple storage device groups may provide their storage areas to a tier. For example, storage device groups of different storage media types and having the same I/O performance capability may provide their storage areas to a tier.

The destination storage device section 355 indicates characteristic information on each storage device group in the destination storage apparatus. Each row indicates information on a storage device group, in this example, information of the storage media type, the I/O performance capability, the total volume size, and the size of volumes unallocated to a pool with respect to the storage device group. The size of unallocated volumes is indicated with a numerical value and a horizontal bar, which has a length corresponding to the numerical value for the size of unallocated volumes.

The destination pool section 356 indicates the sizes of volumes allocated from each storage device group to individual pools. In this example, three pools, Pool_1, Pool_2, and Pool_3 are prepared and each column indicates information on a pool.

A cell for a storage device group in a pool column indicates the size of volumes allocated from the storage device group to this pool. The cell indicates the size of allocated volumes with a numerical value and a horizontal bar having a length corresponding to the numerical value. For example, the sizes of volumes allocated from the second storage device group (SSD (MLC), 20K [IOPS/GB]) to the pools Pool_1, Pool_2, and Pool_3 are 200 GB, 300 GB, and 0 GB, respectively.

A pool column has a width corresponding to the capacity of the pool. In this example, the widths of the pool columns in the destination pool section 356 are the same as the widths of the columns of the same pools in the destination pool section 353 and the columns of these sections are aligned in the row direction.

In each pool column, the horizontal bars representing the allocated volumes are disposed so as not to overlap in the row direction and correspond to a single bar in a stacked bar graph. Indicating the pool capacity of a pool and the sizes of volumes allocated to the pool in such a stacked bar graph enables the storage administrator to easily understand their relations.

The pool characteristics section 380 indicates characteristic information on each pool. In this example, the pool characteristics section 380 indicates the I/O performance capability, the capacity, and the size of unused space of each pool in numerical values. The pool columns for the pools Pool_1, Pool_2, and Pool_3 are continued from the columns of the corresponding pools in the destination pool section 356.

As described above, this example indicates the sizes of volumes allocated from each storage device group in the destination storage apparatus to the pools, the volume sizes of the source volume groups, and the sizes of volumes to be migrated from each source volume group to the pools. The storage administrator can pursue planning of volume migration between storage apparatuses considering performance of volumes before and after the migration even if the migration is for a large number of source volumes.

In the example of FIG. 33, the cells indicating both of a horizontal bar and a numerical value may indicate either one of them. The change in I/O performance capability between before and after the volume migration may be indicated by a manner different from the graphic pattern of the horizontal bar or omitted from the indication. The horizontal bars in one column may be started from the same position in the row direction.

The management computer 102 can provide the same information in FIG. 33 with a different image configuration. For example, the relationship between rows and columns in the foregoing example may be opposite. The source volume groups may be defined on a basis different from the I/O performance capability, for example, the capacity.

Hereinafter, described is an example of a procedure using the volume migration GUI to obtain the example of the configuration result shown in FIG. 33. FIG. 9 is an example of a Select Destination Storage Apparatus window 21 which appears first after start-up of the volume migration GUI. The GUI display control program 231 creates this image and outputs it to the display device 256.

The display device 256 presents this image to the storage administrator. The storage administrator selects a destination storage apparatus 106 from a pull-down list in a section 211 in the Select Destination Storage Apparatus window 21. Upon selection of a Confirm button 212, the processing of a flowchart in FIG. 11 is started, which will be described later.

FIG. 10 illustrates a configuration example of an available storage device table 247 in the management computer 102. The available storage device table 247 is included in the GUI temporary information tables 241 in the management computer 102. The available storage device table 247 stores information on logical volumes that can be allocated to a pool in the selected destination storage apparatus 106. This table 247 is created in accordance with the processing flow of FIG. 11 when the storage administrator presses the Confirm button 212 in the GUI image shown in FIG. 9 after selecting the destination storage apparatus 106.

FIG. 11 is a flowchart of an example of processing to create or update the available storage device table 247. The GUI display control program 231 operates in accordance with this flowchart. In response to selection of the Confirm button 212 with the input device 253, the GUI display control program 231 selects unused logical volumes in the storage apparatus selected as the destination from the logical volume management table 243 (S101). The unused logical volumes are logical volumes for which neither an "Assigned Host" nor an "Assigned Pool" is specified in the logical volume management table 243.

The GUI display control program 231 searches the RAID group management table 245 for the selected logical volumes using their respective RAID group IDs as keys to acquire the "Storage Media Type" of the logical volumes (S102). The GUI display control program 231 stores information of the IDs, the capacities, and the performance capabilities of the logical volumes acquired from the logical volume management table 243 and information of the storage media types acquired from the RAID group management table 245 to the available storage device table 247 (S103).

Figure 12:
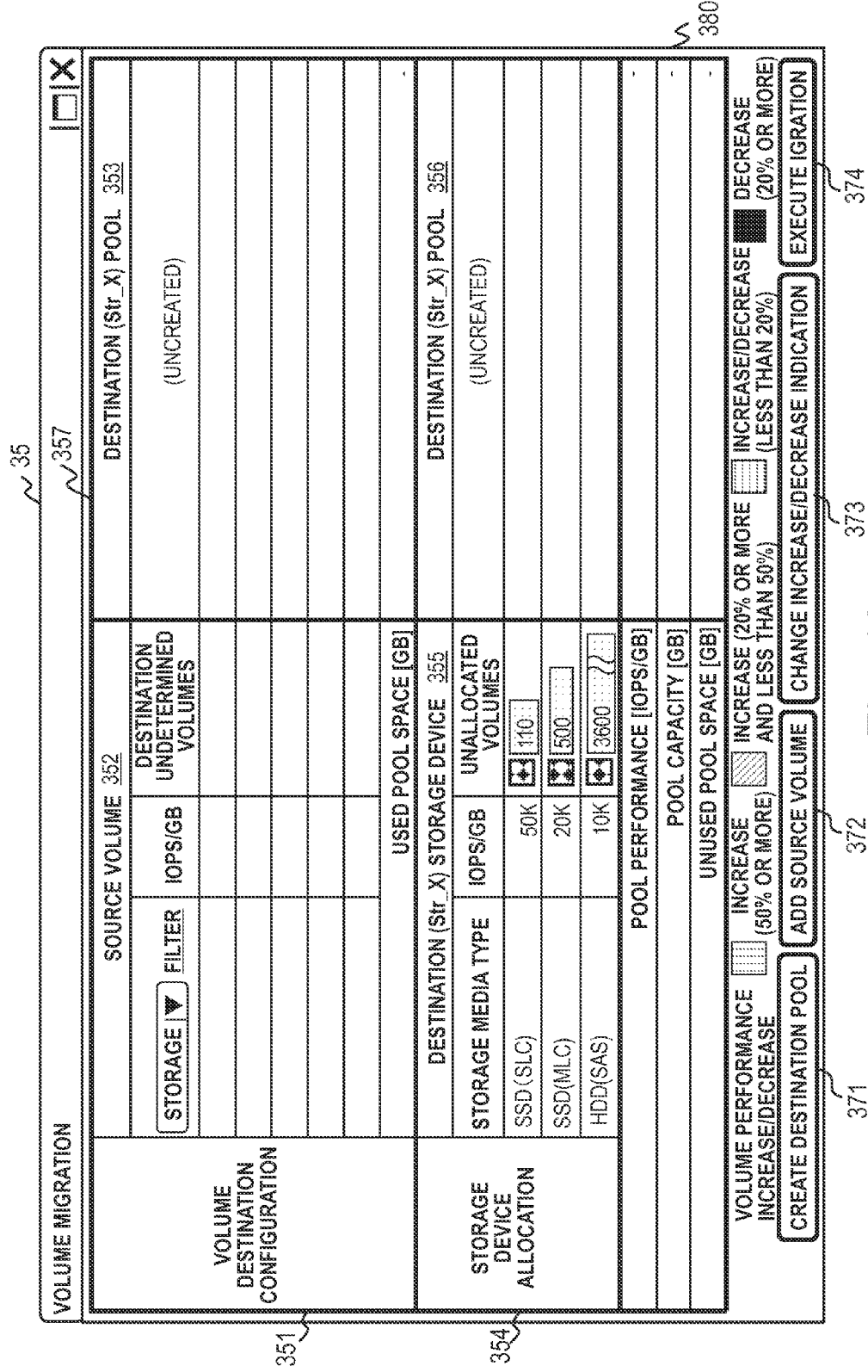
FIG. 12 illustrates an example of an image of a migration configuration window appearing after the destination storage apparatus Str_X has been selected in the Select Destination Storage Apparatus window shown in FIG. 9.

FIG. 12 illustrates an example of an image of the migration configuration window 35 which is presented after the destination storage apparatus Str_X has been selected in the Select Destination Storage Apparatus window 21 in FIG. 9. The destination storage device section 355 in the storage device allocation section 354 indicates information on the media types of the destination storage apparatus Str_X. The source volumes and the pool configuration of the destination storage apparatus Str_X have not been specified yet; the cells in the other sections are blank.

The GUI display control program 231 categorizes the storage devices available in the destination storage apparatus Str_X by storage media type and logical volume performance capability into groups with reference to the available storage device table 247. In this example, three groups different in storage media type are created. Categorizing the available storage devices into groups allows the storage administrator to easily grasp the entirety even if the destination storage apparatus has a large number of logical volumes.

The GUI display control program 231 further calculates the total size of volumes of each storage device group. The GUI display control program 231 creates image data for the migration configuration window 35 including the information on the storage devices in the destination storage apparatus Str_X obtained by the calculation and outputs it to the display device 256.

The GUI display control program 231 receives designation of source volumes and destination pools through inputs to the volume destination configuration section 351. Further, it receives instructions to create pools and specifications about which storage device group should allocate how much space to each pool.

Figure 13:
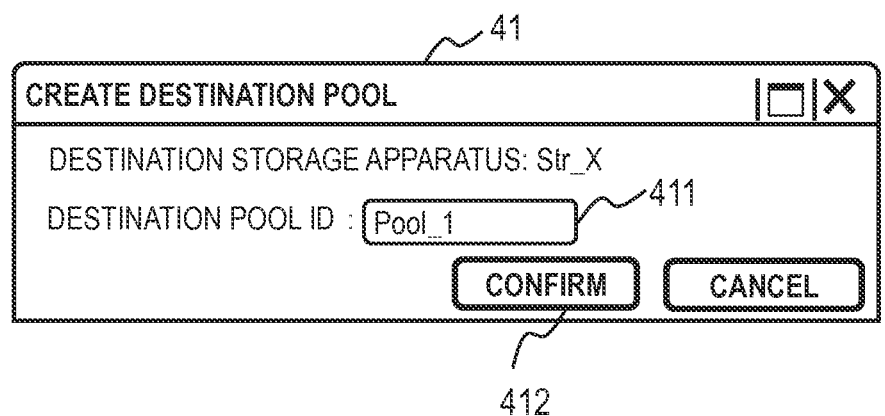
FIG. 13 illustrates an example of a Create Destination Pool window.

When the storage administrator presses the Create Destination Pool button 371 in the migration configuration window 35 of FIG. 12 with the input device 253, the GUI display control program 231 outputs image data for a Create Destination Pool window 41 shown in FIG. 13 to the display device 256. The storage administrator enters a pool ID for the pool to be created in the field 411.

Upon press of a Confirm button 412, the GUI display control program 231 creates a column for the pool in the destination pool section 357 (subsections 353, 356, and 380) in the migration configuration window 35. The storage administrator may repeat pressing the Create Destination Pool button 371 to create a plurality of pools.

Figure 14:
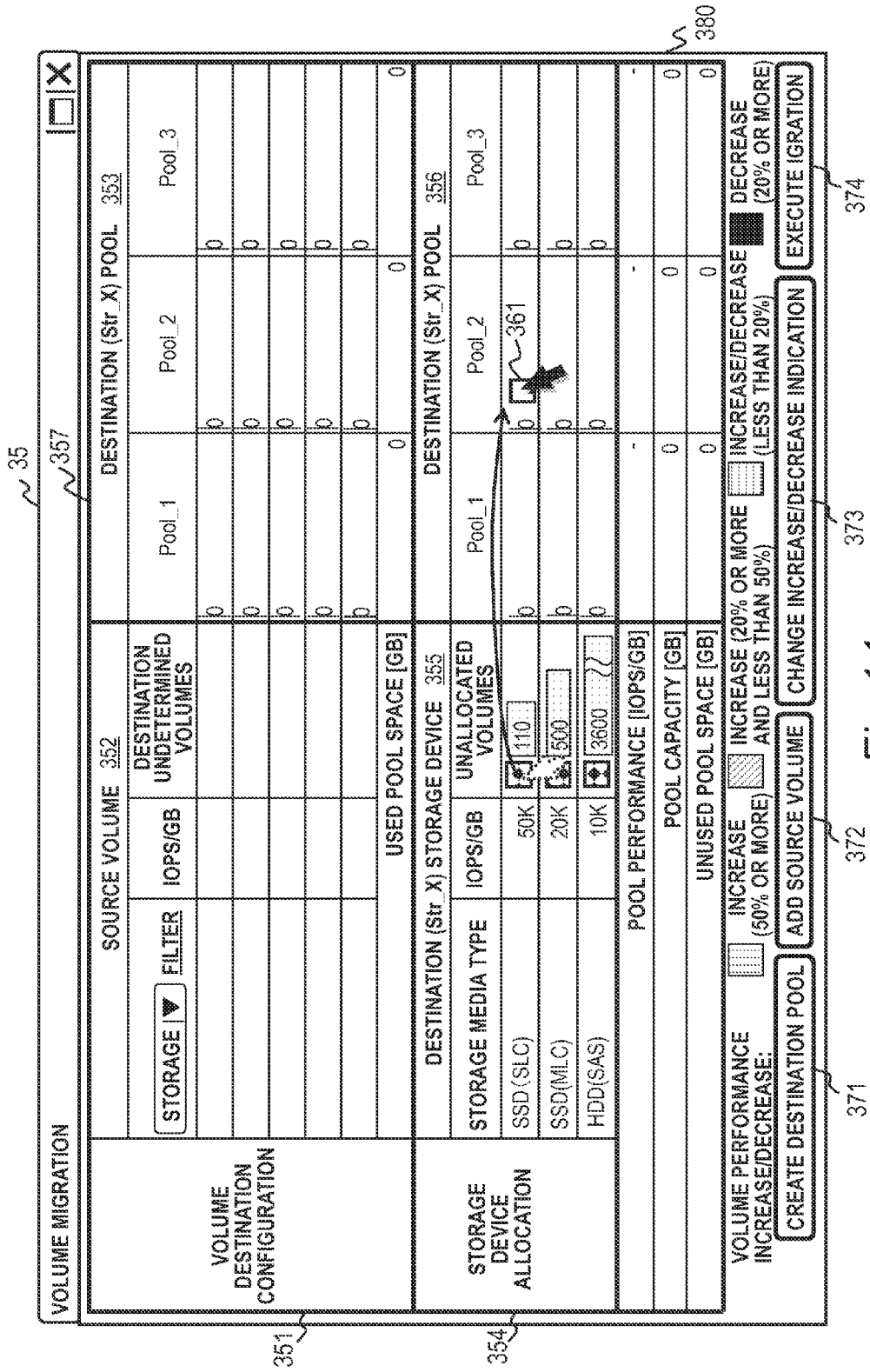
FIG. 14 illustrates a configuration result after three pools have been created as destination pools.

FIG. 14 shows a configuration result after creation of three pools Pool_1, Pool_2, and Pool_3 as destination pools. Although the pools Pool_1, Pool_2, and Pool_3 have been defined, the pools Pool_1, Pool_2, and Pool_3 have not been allocated logical volumes (storage areas of storage devices) yet.

The GUI display control program 231 receives instructions for allocation of a logical volume (a storage area of a storage device) to a pool by drag and drop of an icon 361 (graphic component). This operation enables easy configuration on the same window. Each row in the destination storage device section 355 includes an icon 361.

The storage administrator drags and drops the icon 361 from the destination storage device section 355 to a cell in the destination pool section 356. Through this operation, some space can be allocated from the storage device group corresponding to the cell where the icon 361 is included to the pool corresponding to the cell where the icon is dropped. In the example of FIG. 14, the GUI display control program 231 allocates some space from the storage device group of SSD (SLC) to the pool Pool_2.

Figure 15:
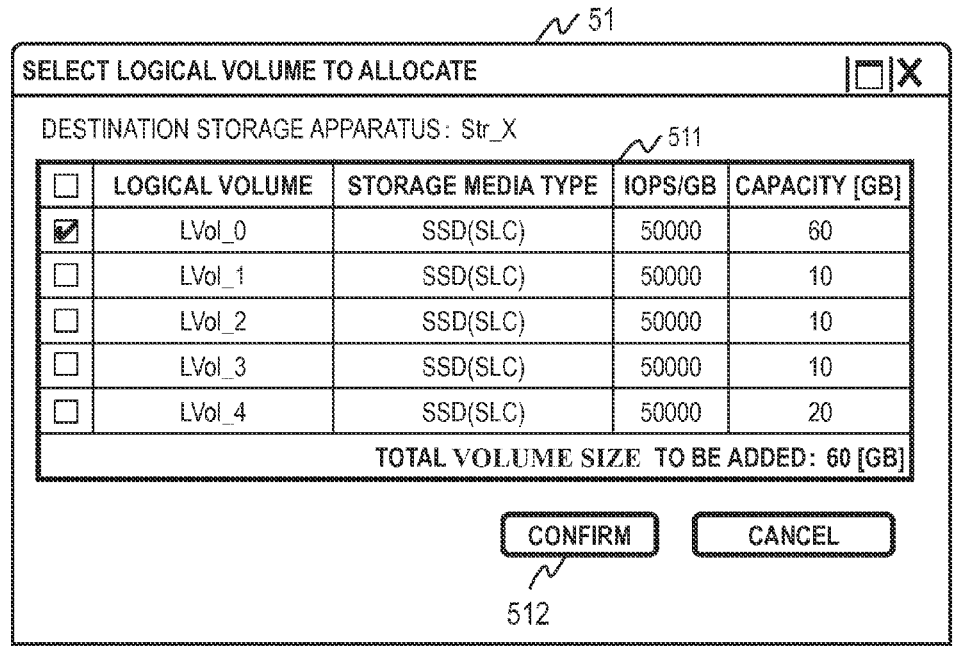
FIG. 15 illustrates an example of a Select Logical Volume to Allocate window to be displayed in response to drop of an icon.

FIG. 15 illustrates an example of a Select Logical Volume to Allocate window 51 to be displayed in response to drop of the icon 361. The GUI display control program 231 creates image data for the Select Logical Volume to Allocate window 51 and outputs it to the display device 256.

The Select Logical Volume to Allocate window 51 indicates a list 511 of unused logical volumes in the selected storage device group. The logical volumes in the list 511 are candidate logical volumes to be allocated to the selected destination pool. In this example, the list 511 indicates characteristics of the logical volumes, which are the storage media type, the I/O performance capability, and the capacity.

Figure 16:
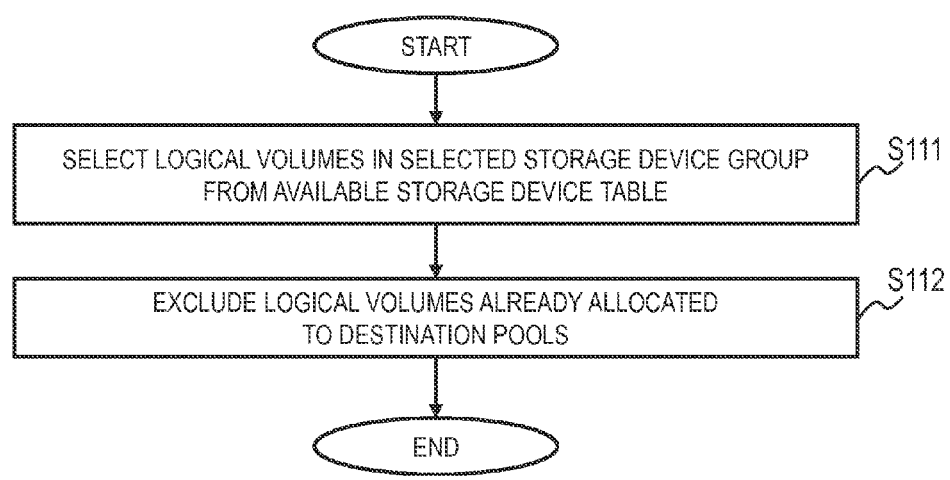
FIG. 16 is a flowchart illustrating an example of a method for a GUI display control program to create a logical volume list in the Select Logical Volume to Allocate window.

FIG. 16 is a flowchart illustrating an example of the method for the GUI display control program 231 to create the list of logical volumes in the Select Logical Volume to Allocate window 51. The GUI display control program 231 selects the logical volumes in the selected storage device group from the available storage device table 247 (S111). As described above, storage device groups are identified by the storage media type and the logical volume performance capability.

The GUI display control program 231 excludes the logical volumes that have already been allocated to some destination pool from the logical volumes selected from the available storage device table 247.

Specifically, the GUI display control program 231 searches a destination pool configuration temporary information table 248. The destination pool configuration temporary information table 248 indicates logical volumes that have already been allocated to pools. Details of the destination pool configuration temporary information table 248 will be described later. If any logical volume is included in the destination pool configuration temporary information table 248, the GUI display control program 231 excludes the logical volume from the logical volumes to be indicated in the list 511 (S112).

FIG. 17 illustrates an example of the destination pool configuration temporary information table 248. The destination pool configuration temporary information table 248 is included in the GUI temporary information tables 241. The destination pool configuration temporary information table 248 holds configuration information for allocation of logical volumes (areas of storage devices) to pools specified in the migration configuration window 35.

The destination pool configuration temporary information table 248 indicates logical volumes allocated to each pool in the destination storage apparatus 106. In this example, the destination pool configuration temporary information table 248 includes characteristic information on logical volumes in addition to the elements in the pool management table 244.

In this example, the destination pool configuration temporary information table 248 indicates the capacity and the I/O performance capability of each pool. Furthermore, it indicates the capacity, the I/O performance capability, and the storage media type of each logical volume. The GUI display control program 231 acquires information on each logical volume from the available storage device table 247. The GUI display control program 231 calculates the I/O performance capability of each pool in accordance with a predetermined formula.

The characteristic information, namely, the capacity, the I/O performance capability, and the storage media type, on each logical volume may be omitted. The destination pool configuration temporary information table 248 including this information enables speedy update of the information indicated in the migration configuration window 35.

Returning to FIG. 15, the GUI display control program 231 receives selection of logical volumes by check in the corresponding check boxes. Upon press of the Confirm button 512, the GUI display control program 231 performs the processing in accordance with the flowchart of FIG. 18.

Figure 18:
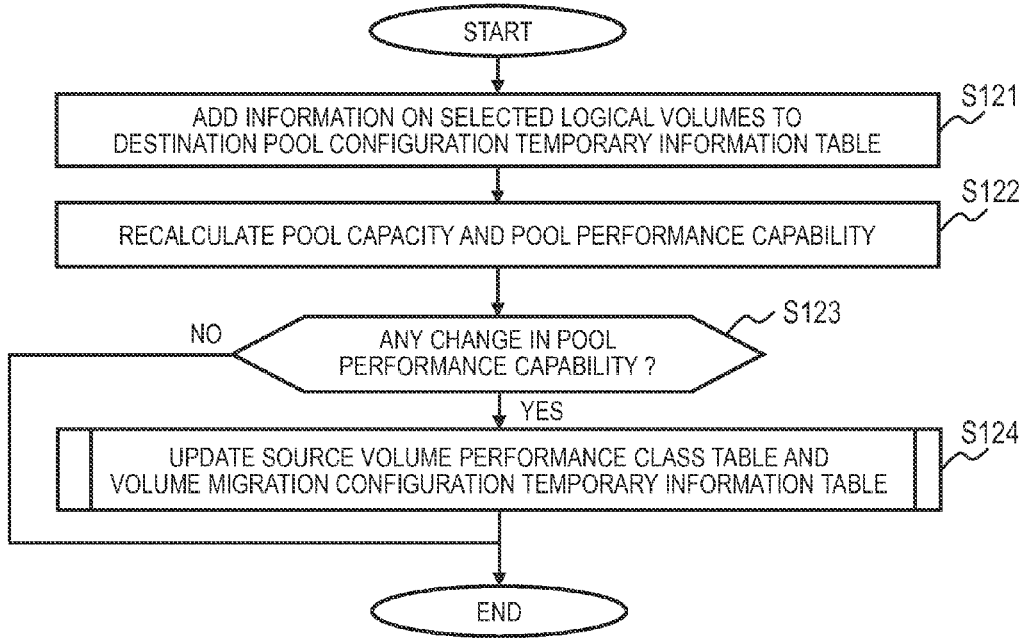
FIG. 18 is a flowchart of the processing performed by the GUI display control program in response to press of a Confirm button 512.

In the flowchart of FIG. 18, the GUI display control program 231 adds information on the logical volumes selected in the Select Logical Volume to Allocate window 51 to the destination pool configuration temporary information table 248 (S121). The GUI display control program 231 adds entries for the selected logical volumes to be the entries of the designated pool. The GUI display control program 231 acquires characteristic information on the logical volumes from the available storage device table 247.

The GUI display control program 231 recalculates the pool capacity and pool performance capability of each pool (S122). The pool capacity is a total size of all the logical volumes allocated to the pool and the pool performance capability is calculated from I/O performance capabilities of the allocated logical volumes in accordance with a predetermined formula.

If pool performance capability of any pool has changed (S123: YES), the GUI display control program 231 updates a source volume performance class table 246 and a volume migration configuration temporary information table 249 (S124).

Figure 19:
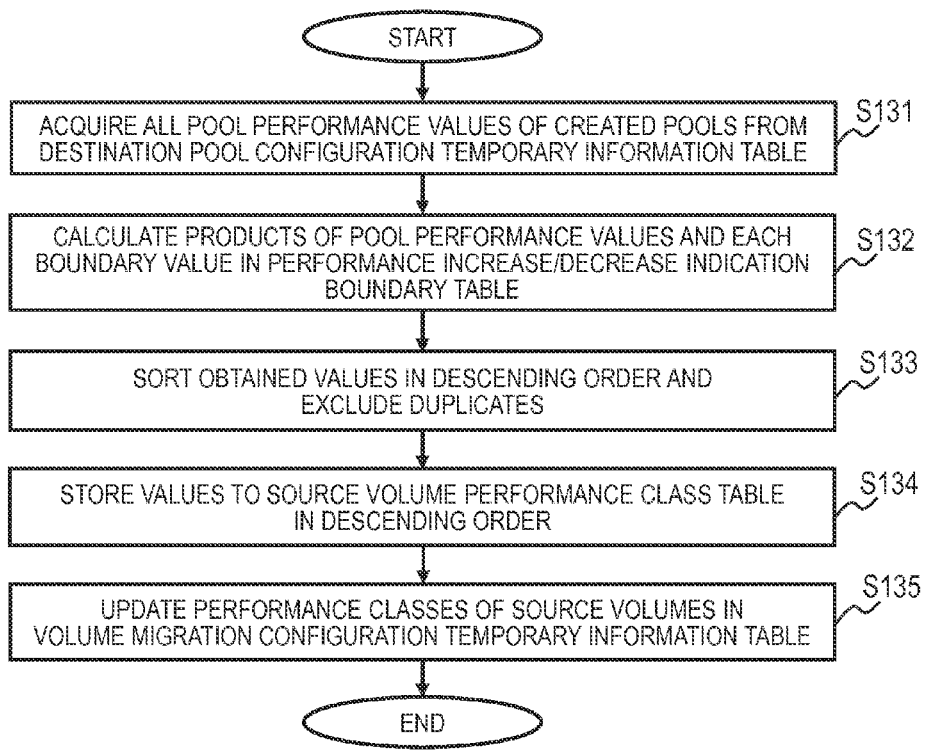
FIG. 19 illustrates details of Step S124 in the flowchart of FIG. 18.

FIG. 19 illustrates details of Step 124 in the flowchart of FIG. 18. Before describing the flowchart of FIG. 19, a source volume performance class table 246 and a performance increase/decrease indication boundary table 292 are described. FIG. 20 illustrates an example of the source volume performance class table 246 and FIG. 21 illustrates an example of the performance increase/decrease indication boundary table 292.

The source volume performance class table 246 is included in the GUI temporary information tables 241. The source volume performance class table 246 indicates classes of I/O performance capability to be the references to define source volume groups. The source volumes constituting a source volume group are included in the same performance class. The source volume performance class table 246 defines each performance class with the lowest performance and the highest performance.

The performance increase/decrease indication boundary table 292 is included in the GUI temporary information tables 241. The performance increase/decrease indication boundary table 292 holds boundary values in indication of increase/decrease in performance capability between before and after migration in the migration configuration window 35. The example of FIG. 21 defines four performance increase/decrease indication ranges: increase by 50% or more, increase by 20% or more and less than 50%, increase/decrease by less than 20%, and decrease by 20% or more.

The GUI display control program 231 calculates source volume performance classes from the boundary values in performance increase/decrease indication between before and after migration. As a result, the volumes migrated from the same source volume group to the same pool will be in the same performance increase/decrease indication range.

Returning to FIG. 19, the GUI display control program 231 acquires all pool performance values of the created pools from the destination pool configuration temporary information table 248 (S131). The GUI display control program 231 calculates products of the acquired pool performance values and each boundary value in the performance increase/decrease indication boundary table 292 (S132). The GUI display control program 231 sorts the obtained values in descending order and excludes duplicate values (S133).

The GUI display control program 231 stores the remaining values to the source volume performance class table 246 in descending order (S134). As a result, the performance classes of the source volumes are redefined in accordance with the change in pool performance. With the new performance classes, the volumes migrated from the same source volume group to the same pool are in the same performance increase/decrease indication range.

The GUI display control program 231 updates the performance classes of the source volumes in the volume migration configuration temporary information table 249 in accordance with the redefined performance classes (S135). As will be described later with reference to FIG. 27, the volume migration configuration temporary information table 249 manages relations between source volumes and destination pools specified in the migration configuration window 35 and has a column of performance classes of source volumes.

FIG. 22 illustrates an example of a Change Increase/Decrease Indication window 73, which is created and displayed by the GUI display control program 231 in response to press of the Change Increase/Decrease Indication button 373 in the migration configuration window 35. The GUI display control program 231 receives changes in boundary values in performance increase/decrease indication through the Change Increase/Decrease Indication window 73.

When the Confirm button 731 is pressed after values are entered in the Change Increase/Decrease Indication window 73, the GUI display control program 231 updates the performance increase/decrease indication boundary table 292 with the entered values. Upon update of the performance increase/decrease indication boundary table 292, the GUI display control program 231 executes the processing according to the flowchart of FIG. 19.

Figure 23:
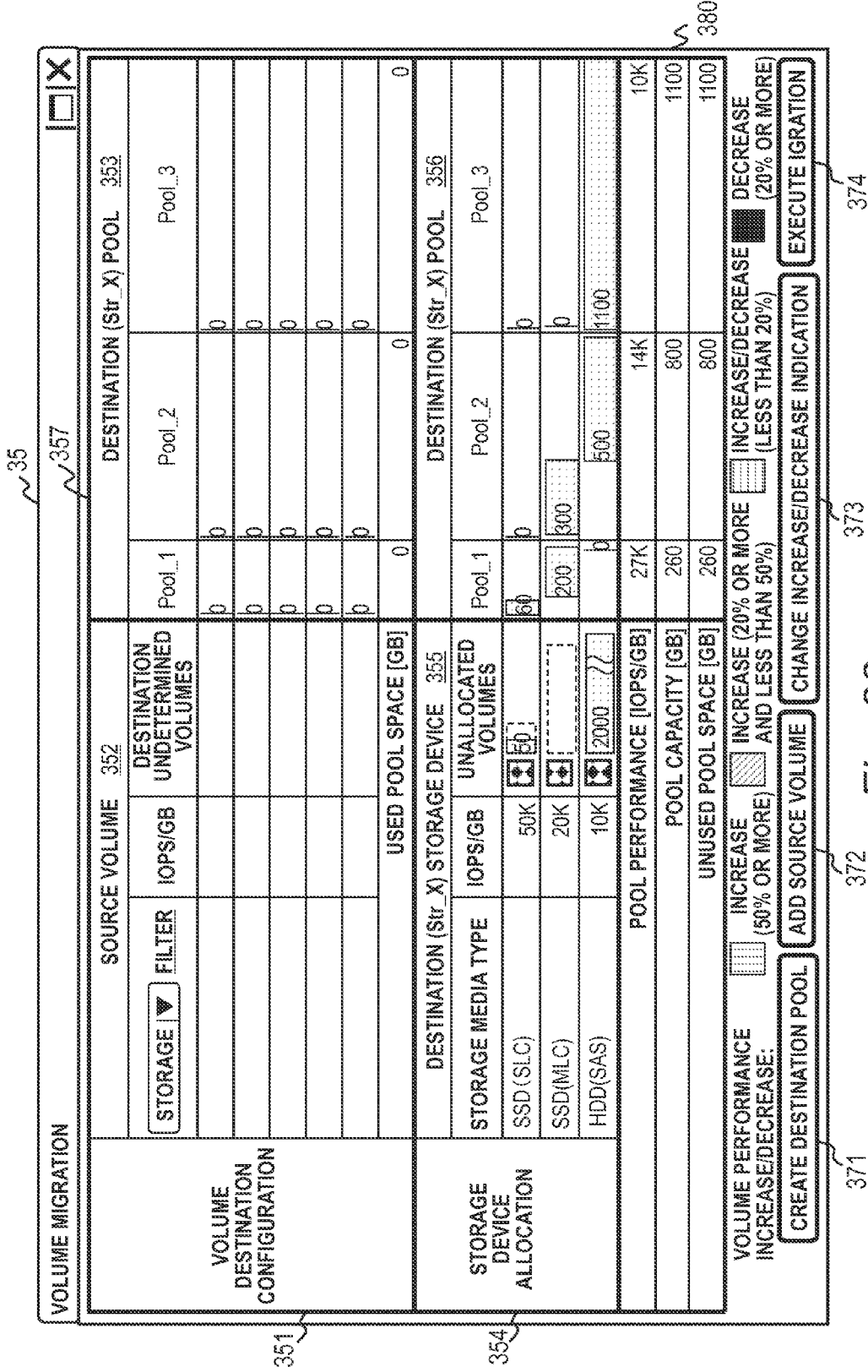
FIG. 23 illustrates an example of the migration configuration window updated by the GUI display control program after allocation of logical volumes to the pools in the destination storage apparatus.

FIG. 23 illustrates an example of the migration configuration window 35 updated by the GUI display control program 231 after allocation of logical volumes to the pools Pool_1, Pool_2, and Pool_3 in the destination storage apparatus.

The destination pool section 356 indicates the sizes of logical volumes allocated to each pool on a storage device group basis. One cell represents a total size of logical volumes allocated from one storage device group to one pool.

In the destination pool section 356, each column indicates information on the sizes of volumes allocated to a pool; from the top to the bottom, the sizes of volumes allocated from storage device groups are provided in descending order of performance capability. In each pool column, horizontal bars are disposed so as not to overlap in the row direction. In this way, each pool column indicates the sizes of volumes allocated from storage device groups in the form of a stacked bar graph.

The GUI display control program 231 determines the lengths of the horizontal bars and the widths of the pool columns in accordance with the sizes of the allocated volumes. For example, the GUI display control program 231 determines the lengths of the horizontal bars and the width of the pool column based on the products of a proportionality coefficient and the sizes of allocated volumes. In the destination pool sections 356 and 353, the widths of the columns of the same pool are the same.

The GUI display control program 231 calculates values of the pool performance, the pool capacity, and the unused pool space to be indicated in the pool characteristics section 380 for each pool from the size of volumes allocated to each pool. The pool performance is calculated from the performance capabilities and the sizes of allocated volumes of the storage device groups with a predetermined formula. The pool capacity and the unused pool space are both the total size of volumes allocated to the pool.

In the destination storage device section 355, the size of unallocated volumes in each storage device group decreases in accordance with the size of volumes allocated to the pools. The GUI display control program 231 subtracts the size of allocated volumes from the total size of volumes in each storage device group to obtain the size of unallocated volumes and determines the length of the horizontal bar in accordance with the value. For example, it employs the same method of calculating the lengths of horizontal bars in the destination pool section 356.

FIG. 24 illustrates an example of an Add Source Volume window 72 created and displayed by the GUI display control program 231 in response to press of an Add Source Volume button 372 in the migration configuration window 35. The GUI display control program 231 receives selection of source volumes through the Add Source Volume window 72.

The storage administrator designates a source storage apparatus in the Add Source Volume window 72 and further designates source volumes among the volumes in the source storage apparatus. Press of a Confirm button 721 fixes the inputs.

FIG. 25 is a flowchart of the processing of the GUI display control program 231 to create a list of volumes to be displayed in the Add Source Volume window 72. The GUI display control program 231 acquires a list of virtual volumes from the virtual volume management table 242 (S141). The list includes information to be indicated in the Add Source Volume window 72; in this example, information on the owner storage apparatus and the characteristics of each virtual volume is included.

The GUI display control program 231 excludes virtual volumes included in the volume migration configuration temporary information table 249 from the foregoing virtual volume list (S142). As will be described later, the volume migration configuration temporary information 249 manages source volumes that have already been selected. Accordingly, created is a list of unselected volumes.

Upon press of the Confirm button 721 in the Add Source Volume window 72 in FIG. 24, the GUI display control program 231 executes the processing illustrated in the flowchart in FIG. 26. The GUI display control program 231 stores the information on the selected virtual volumes in the volume migration configuration temporary information table 249. The GUI display control program 231 identifies the performance classes to which the virtual volumes belong and stores the IDs of the identified performance classes in the volume migration configuration temporary information table 249.

FIG. 27 illustrates a configuration example of the volume migration configuration temporary information table 249. The volume migration configuration temporary information table 249 is included in the GUI temporary information tables 241. The volume migration configuration temporary information table 249 holds information on the source volumes and their respective destination pools selected with the GUI in this embodiment.

FIG. 27 shows the volume migration configuration temporary information table 249 after source volumes have been added through the processing with the Add Source Volume window 72. In FIG. 27, the volume migration configuration temporary information table 249 holds information on the source volumes but does not hold information on the destination pools since the destination pools have not been specified yet, and holds only information on the destination storage apparatus Str_X for the information on the destination.

The volume migration configuration temporary information table 249 stores information on the owner apparatuses and the characteristics of the source volumes. For the information on the owner apparatuses in this example, the owner storage apparatus and the assigned host are held. For the characteristic information, the maximum size, the actual size in use, the volume performance, and the performance class are held. The volume migration configuration temporary information table 249 further holds information on the storage apparatus and the pool performance of the destination pool, and information on the performance increase/decrease between before and after volume migration.

The information on the maximum size, the actual size in use, the volume performance, and the assigned host of the virtual volume may be omitted since other tables hold the same information. The volume migration configuration temporary information table 249 holding these items enables speedy update (creation) of the migration configuration window 35.

Figure 28:
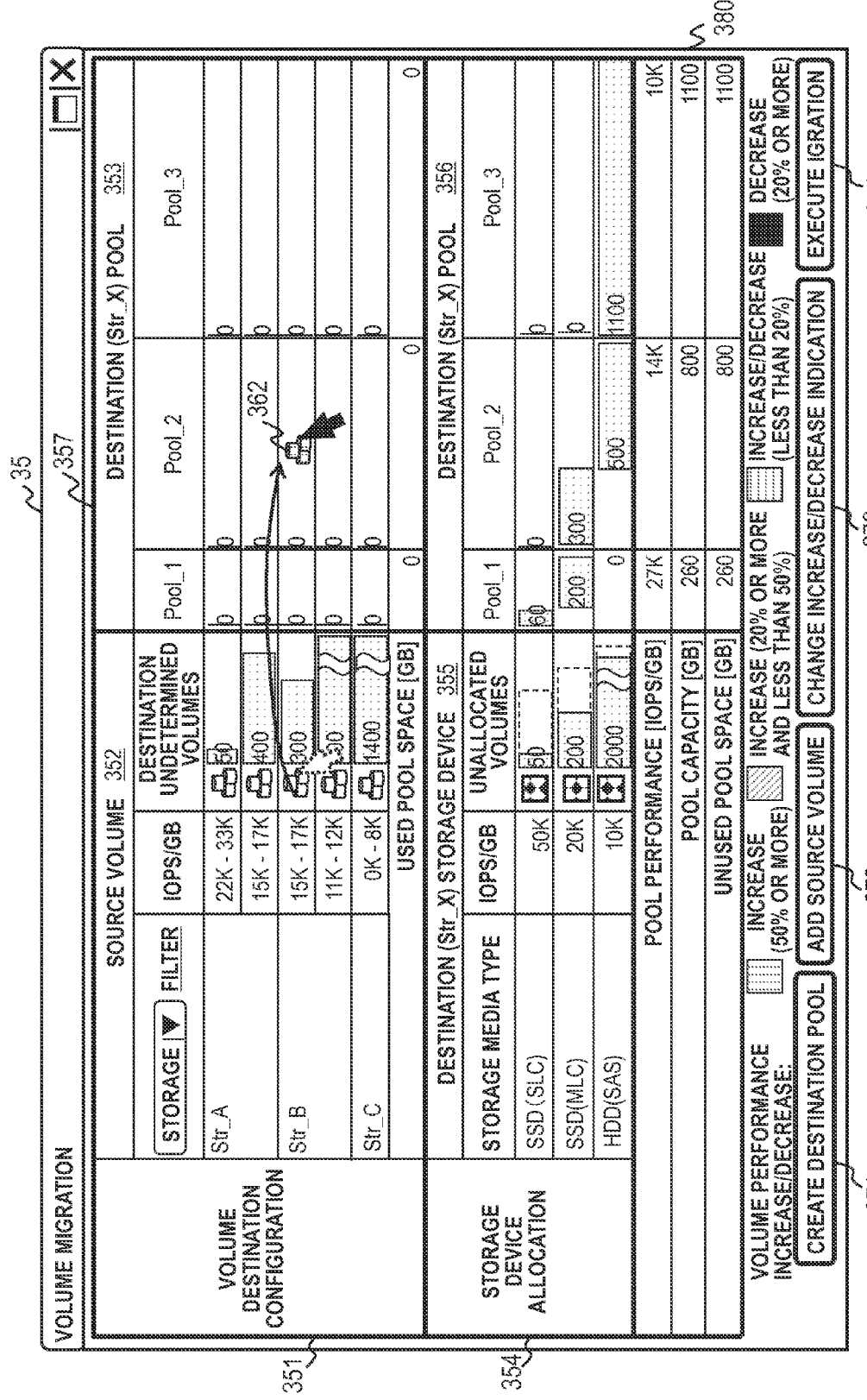
FIG. 28 illustrates the migration configuration window after addition of source volumes through the processing with the Add Source Volume window.

The GUI display control program 231 updates the migration configuration window 35 with the information on the source volumes in the volume migration configuration temporary information table 249. FIG. 28 shows the migration configuration window 35 after source volumes have been added through the processing with the Add Source Volume window 72.

The GUI display control program 231 updates the information indicated in the source volume section 352 in response to the addition of source volumes. The GUI display control program 231 updates the source volume section 352 in response to every press of the Confirm button 721 in the Add Source Volume window 72.

The GUI display control program 231 categorizes the source volumes into groups depending on the performance class to which the source volume belongs. The GUI display control program 231 gathers the source volumes in the same storage apparatus and belonging to the same performance class into a source volume group. The GUI display control program 231 calculates the capacity of each source volume group by summing the capacities of the source volumes in the source volume group.

The GUI display control program 231 creates and displays entries of the created source volume groups in the source volume section 352. The GUI display control program 231 indicates the sizes of destination undetermined volumes in the source volume groups in numerals and graphs. Since no volumes are allocated to the pools, the size of each source volume group is equal to the size of the destination undetermined volumes.

The GUI display control program 231 receives designation of destination pools for source volumes (a source volume group) by drag and drop of an icon 362. The operation of the icon 362 enables easy designation of a destination pool on the same window. Each row in the source volume section 352 includes an icon 362.

The storage administrator drags and drops the icon 362 from the source volume section 352 to a cell in the destination pool section 353. Through this operation, the volumes can be migrated from the source volume group of the cell including the icon 362 to the pool corresponding to the cell where the icon 362 is dropped.

In the example of FIG. 28, volume migration is specified from the source volume group having a performance capability of 15K-17K in the storage apparatus Str_B to the pool Pool_2. The GUI display control program 231 may calculate and display the increase/decrease in performance in the destination pool before the drop.

Figure 29:
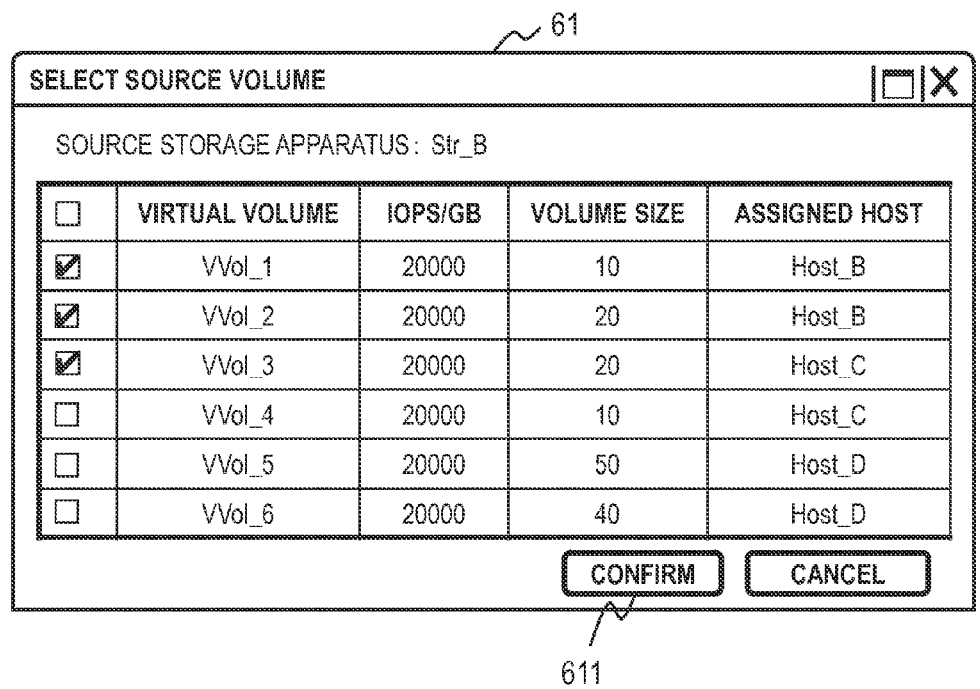
FIG. 29 illustrates an example of a Select Source Volume window displayed in response to drop of an icon.

FIG. 29 illustrates an example of a Select Source Volume window 61 to be displayed in response to drop of the icon 362. The GUI display control program 231 creates image data for the Select Source Volume window 61 and outputs it to the display device 256. This window offers easy configuration on the same window to the storage administrator.

The Select Source Volume window 61 indicates volumes in the source volume group designated in the migration configuration window 35. The GUI display control program 231 receives selection of volumes to be migrated to the pool from the storage administrator. Upon press of the Confirm button 611, the selection is fixed.

Figure 30:
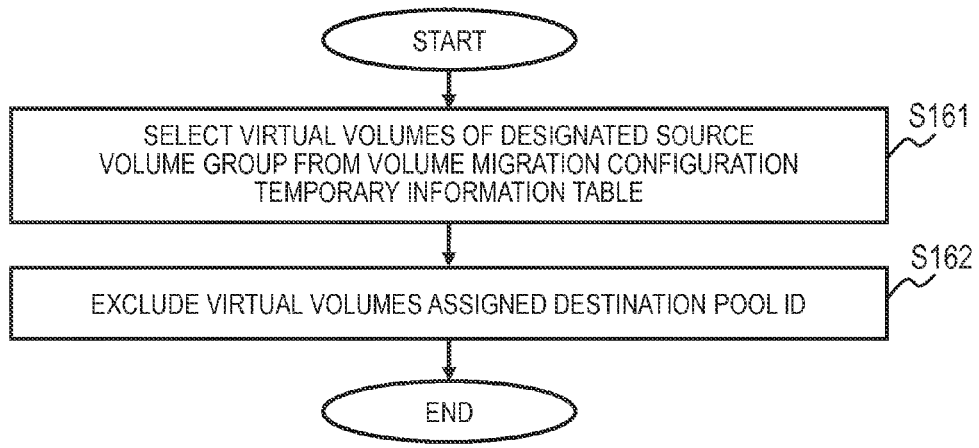
FIG. 30 is a flowchart illustrating an example of processing to create a source volume list in the Select Source Volume window.

FIG. 30 illustrates a flowchart of an example of processing to create a source volume list in the Select Source Volume window 61. The GUI display control program 231 selects the virtual volumes of the source volume group designated in the migration configuration window 35 from the volume migration configuration temporary information table 249 (S161). The GUI display control program 231 selects the virtual volumes having the source storage apparatus ID and the performance class ID of the designated source volume group.

The GUI display control program 231 excludes the virtual volumes to which destination pool IDs have been assigned in the volume migration configuration temporary information table 249 from the virtual volumes selected at Step S161 (S162). The remaining virtual volumes are indicated in the Select Source Volume window 61; they are selectable virtual volumes.

Figure 31:
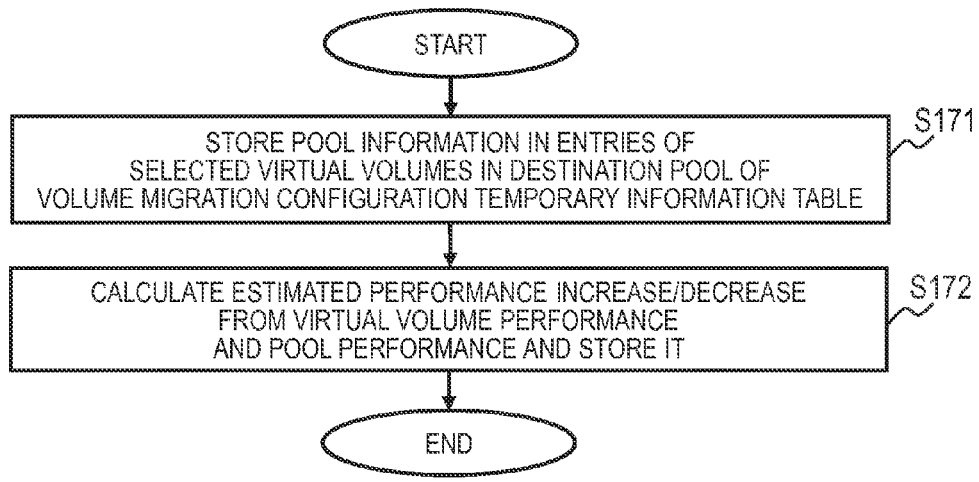
FIG. 31 is a flowchart illustrating an example of processing of the GUI display control program in response to press of a Confirm button in the Select Source Volume window.

FIG. 31 illustrates a flowchart of an example of processing performed by the GUI display control program 231 in response to press of the Confirm button 611 in the Select Source Volume window 61.

The GUI display control program 231 stores, in the volume migration configuration temporary information table 249, information on the destination pool in the entries of the virtual volumes selected in the Select Source Volume window 61 (S171). The storage apparatus ID and the pool ID are values designated in the migration configuration window 35 and the value of the pool performance is acquired from the destination pool configuration temporary information table 248.

The GUI display control program 231 calculates estimated performance increase/decrease from the performance capability of the volume and the performance capability of the destination pool for each source virtual volume and stores the result in each entry of the volume migration configuration temporary information table 249. The GUI display control program 231 calculates the estimated performance increase/decrease based on the performance capability either before the migration or after the migration. To indicate the estimated performance increase/decrease before drop of the icon 362, the GUI display control program 231 calculates and displays the estimated performance increase/decrease on the memory 255 without storing the pool information in the volume migration configuration temporary information table 249.

FIG. 32 illustrates a volume migration configuration temporary information table 249 after destination pools have been specified for the source volumes. Each column of the destination pool holds information on the destination pool.

FIG. 33 illustrates the migration configuration window 35 after destination pools have been specified. The information appearing in the migration configuration window 35 in FIG. 33 has already been described. The GUI display control program 231 updates the migration configuration window 35 in response to every press of the Confirm button 611 in the Select Source Volume window 61. The GUI display control program 231 updates the information in the volume destination configuration section 351 and the pool characteristics section 380.

The GUI display control program 231 accepts a change in specification of the size of volumes allocated to a pool after fixing the destinations for a part or all of the source volumes through the migration configuration window 35. The GUI display control program 231 updates the information in each section in the migration configuration window 35 in accordance with the change in pool configuration. Hence, the storage administrator can always grasp how the volume performance increases or decreases in the destination with change in configuration of destination pools.

When the pool configuration is changed, the GUI display control program 231 performs processing in accordance with the flowcharts of FIGS. 18 and 19. Furthermore, the GUI display control program 231 updates the volume migration configuration temporary information table 249. The GUI display control program 231 updates the image of the volume destination configuration section 351 in accordance with the information in the updated volume migration configuration temporary information table 249.

The redefined performance classes require update of the performance class IDs of the source volumes in the volume migration configuration temporary information table 249. In the volume destination configuration section 351, accordingly, the number of entries for source volume groups, the highest and lowest values of performance classes, the sizes of destination undetermined volumes, the sizes of volumes to be migrated to destination pools, the performance increase/decrease indication, and the like are updated.

Upon press of the Execute Migration button 374 in the migration configuration window 35, the GUI display control program 231 sends the migration control program 233 an instruction to perform volume migration together with the configuration information.

In the foregoing example, each source volume group is composed of the volumes of the same source storage apparatus. Each source volume group can be composed of the volumes assigned to the same host. In an example, the GUI display control program 231 forms source volume groups on the basis of the storage apparatuses or hosts in accordance with designation by the storage administrator. In this way, source volume groups can be formed as desired by the user. The GUI display control program 231 can acquire information on the assigned hosts for the source volumes from the virtual volume management table 242.

Figure 34:
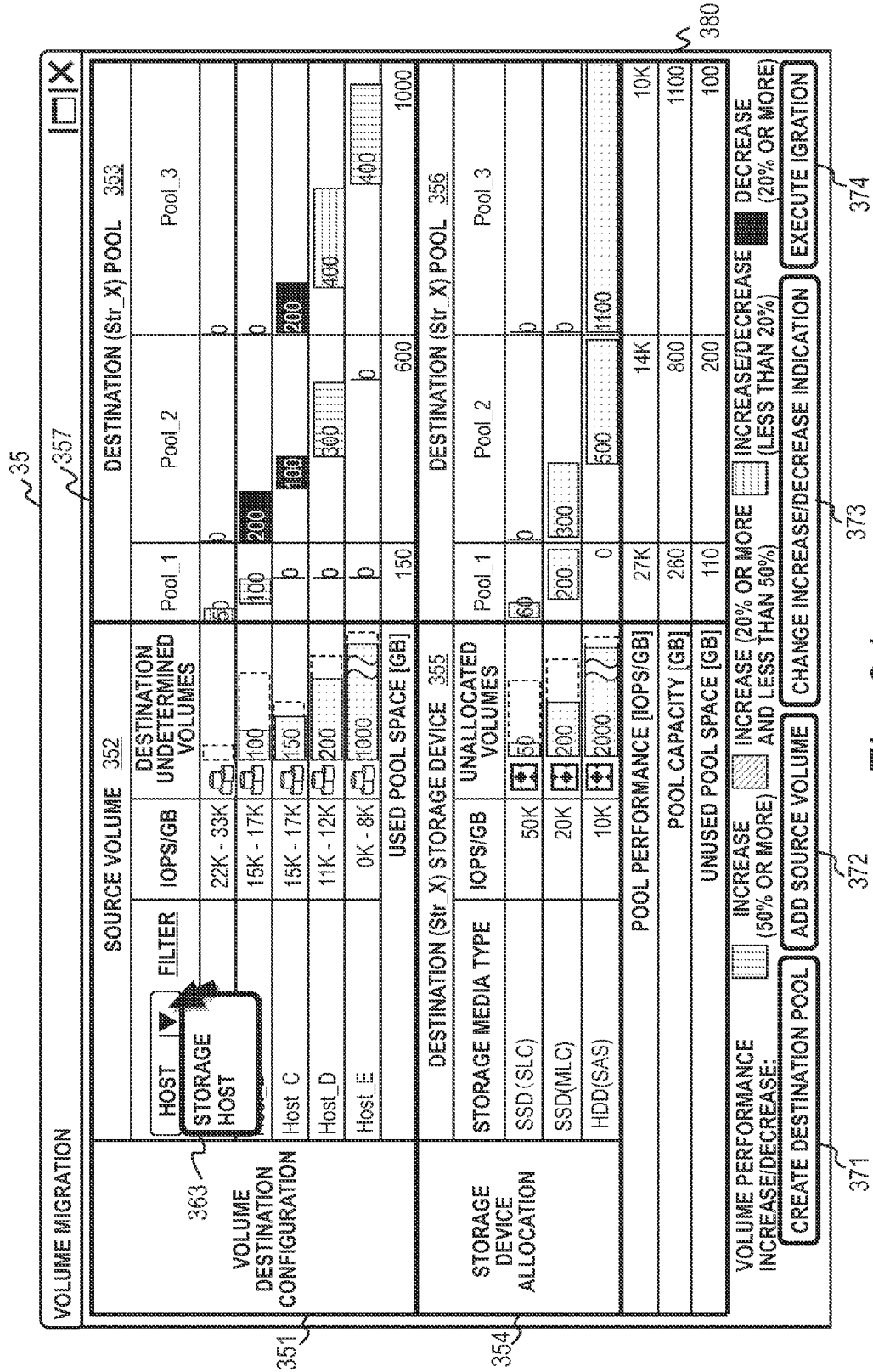
FIG. 34 illustrates an example of the migration configuration window allowing a choice between storage apparatuses and hosts as a basis to form source volume groups.

FIG. 34 illustrates an example of the migration configuration window 35 that allows choice between storage apparatuses and hosts as the basis to form source volume groups. The storage administrator chooses either storage apparatuses or hosts from a pull-down menu 363. The GUI display control program 231 forms source volume groups in accordance with the chosen basis. That is to say, in the case of hosts, the GUI display control program 231 forms source volume groups with source volumes assigned to the same host and in the same performance class.

For example in the flowchart of FIG. 30, the GUI display control program 231 selects virtual volumes in the designated source volume group from the volume migration configuration temporary information table 249. At this step, the GUI display control program 231 selects virtual volumes of the entries including the assigned host and the performance class ID for the designated source volume group.

Figure 35:
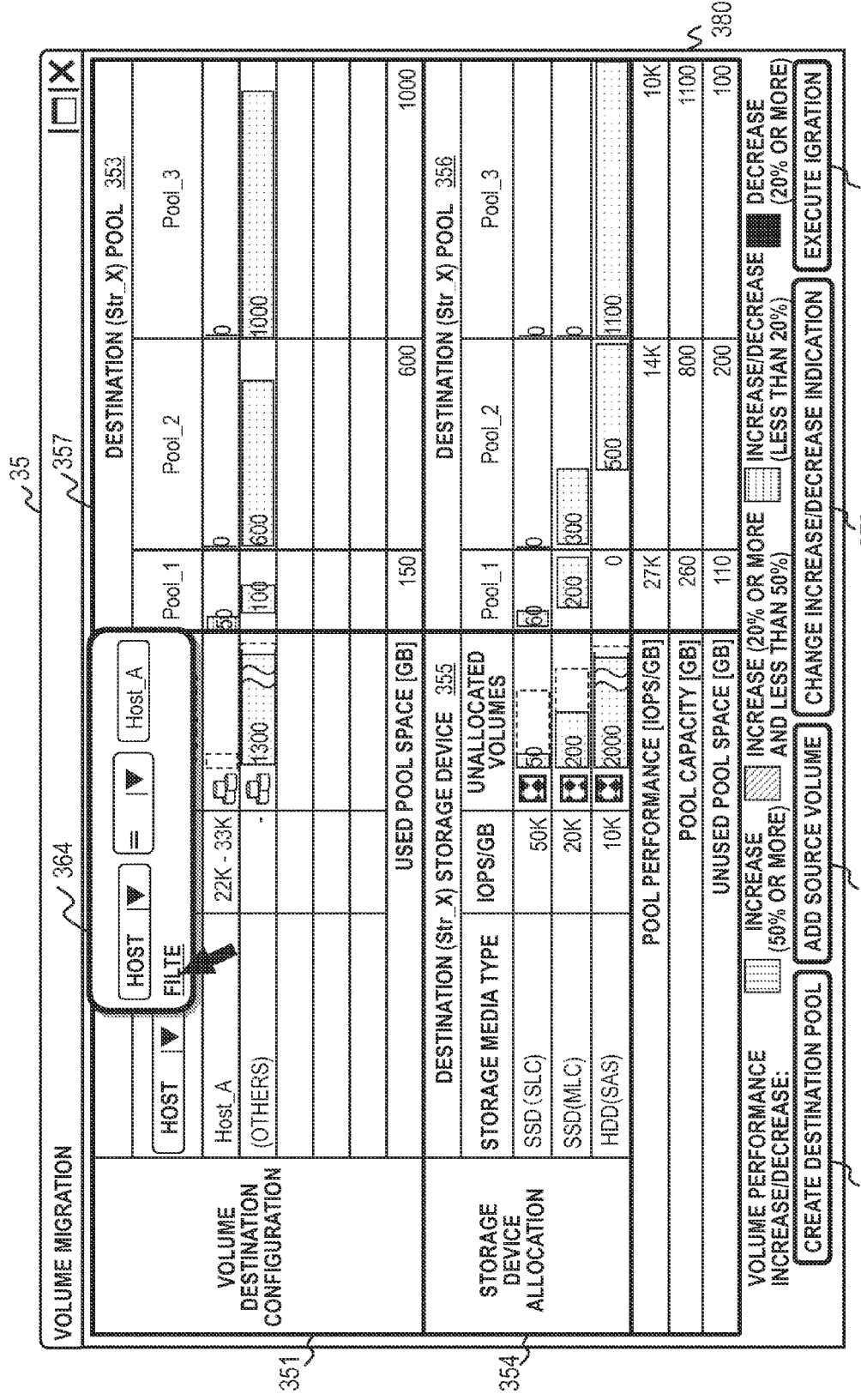
FIG. 35 illustrates an example of receiving selection of a source volume group to be indicated in the migration configuration window.

FIG. 35 illustrates an example of receiving selection of a source volume group to be indicated in the migration configuration window 35. Upon selection of the "Filter" link, the GUI display control program 231 displays a filter section 364. In the filter section 364, the GUI display control program 231 accepts designation of an assigned host for the source volume groups to be indicated in the migration configuration window 35.

The GUI display control program 231 unifies all the source volumes of the undesignated assigned hosts into one source volume group and displays this source volume group as one entry. As to the designated host, the GUI display control program 231 forms source volume groups as described above.

In the case where many hosts are assigned to the source volumes, this operation compresses the indication space to provide discriminable information in the migration configuration window 35. Although FIG. 35 illustrates an example of filtering the hosts, the same filtering can apply to the storage apparatuses. The GUI display control program 231 does not need to have the filtering function to form source volume groups.

This invention is not limited to the above-described embodiment but includes various modifications. The foregoing embodiment has been described in details for better understanding of this invention and is not limited to the one including all the configurations described above. A part of the configuration of one example may be replaced with that of another example; the configuration of one example may be incorporated to the configuration of another example. A part of the configuration of each example may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs for implementing the functions. The information of programs, tables, and files to implement the functions may be stored in a storage device such as a memory, a hard disk drive, or an SSD (Solid State Drive), or a storage medium such as an IC card, or an SD card.

What is claimed is:

1. A storage management system for managing source storage apparatuses including source volumes and a destination storage apparatus to which the source volumes are migrated, the storage management system comprising:
   a processor;
   an input device;
   a display device; and
   a memory device,
   the memory device holding:
      volume management information including information on owner apparatuses and characteristics of the source volumes;
      destination pool configuration management information created based on user specifications through the input device and including sizes of volumes to be allocated from storage device groups in the destination storage apparatus to destination pools; and
      volume migration configuration management information created based on user specifications through the input device and including information on relations between the source volumes and the destination pools,
   wherein the processor determines source volume groups to which the source volumes belong based on the volume management information,
   wherein the processor determines sizes of volumes to be allocated from the storage device groups to the destination pools based on the destination pool configuration management information,
   wherein the processor determines sizes of volumes to be migrated from the source volume groups to the destination pools based on the volume migration configuration management information,
   wherein the processor creates image data indicating information on the determined sizes of volumes to be allocated and the sizes of volumes to be migrated,
   wherein the processor outputs the image data to the display device,
   wherein the image displayed with the image data includes sections each indicating information on one of the destination pools,
   wherein each of the sections is a column or a row consisting of a plurality of cells, wherein each of the sections includes a first subsection and a second subsection, wherein each cell in the first subsection indicates a size of volumes to be migrated from one of the source volume groups, and wherein each cell of the second subsection indicates a size of volumes to be allocated from one of the storage device groups.

2. A storage management system according to claim 1, wherein the processor includes information on sizes of destination undetermined volumes of the source volume groups and sizes of unallocated volumes of the storage device groups in the image data, and wherein the processor accepts specifications of migration of volumes from the source volumes groups to the destination pools and specifications of allocation of volumes from the storage device groups to the destination pools through user inputs to an image displayed with the image data.

3. A storage management system according to claim 1, wherein the sections are columns each consisting of a plurality of cells and are aligned in a row direction, wherein the columns each have a width proportional to a capacity of a corresponding destination pool, wherein, in each cell in the sections, a horizontal bar having a length proportional to a size of corresponding volumes represents the size of the corresponding volumes, wherein the horizontal bars in the cells of the first subsection are disposed not to be overlapped and to be continued in a row direction, and wherein the horizontal bars in the cells of the second subsection are disposed not to be overlapped and to be continued in a row direction.

4. A storage management system according to claim 1, wherein the processor determines, in accordance with user specifications, the source volume groups to which the source volumes belong in such a manner that each of the source volume groups consists of source volumes owned by a same storage apparatus or a same host apparatus, based on the volume management information.

5. A storage management system according to claim 1, wherein the volume management information includes information on performance capabilities of the source volumes, wherein the memory device holds performance class information defining performance classes for the source volumes, and wherein the processor determines source volume groups to which the source volumes belong in such a manner that each of the source volume groups consists of source volumes belonging to the same performance class, based on the performance class information and the volume management information.

6. A storage management system according to claim 5, wherein the destination pool configuration management information includes information on performance capabilities of the destination pools, wherein the processor determines increase or decrease in performance capability between before and after migration for each of the source volumes, based on the volume management information and the destination pool configuration management information, and wherein the processor includes information indicating a result of the determination in the image data.

7. A storage management system according to claim 6, wherein, when the sizes of volumes to be allocated from the storage device groups to the destination pools are changed, the processor updates the performance capabilities of the destination pools in the destination pool configuration management information in accordance with the changes, wherein the processor redetermines increase or decrease in performance capability between before and after migration for each of the source volumes, based on the volume management information and the destination pool configuration management information, and wherein the processor updates the image data to include a result of the redetermination and outputs the updated image data to the display device.

8. A storage management system according to claim 1, wherein the image provided by the image data includes cells corresponding to the storage device groups and cells corresponding to the source volume groups, wherein the processor receives designation of a storage device group to allocate volumes and a destination pool to which the volumes are allocated by drag and drop of an image component from the cell corresponding to the storage device group to a cell corresponding to the destination pool, and wherein the processor receives designation of a source volume group including source volumes to be migrated and a destination pool by drag and drop of an image component from the cell corresponding to the source volume group to a cell corresponding to the destination pool.

9. A storage management system according to claim 8, wherein, in response to the drop, the processor creates an image data for showing a list of unallocated volumes in the source volume group and outputs the image data to the display device.

10. A storage management system according to claim 1, wherein the volume management information includes information on owner apparatuses of the source volumes, wherein the processor receives selection by the user of an owner apparatus of the source volumes, and wherein the processor includes source volumes of a plurality of owner apparatuses other than the selected owner apparatus in one source volume group.

11. A storage management method performed by a storage management system for managing source storage apparatuses including source volumes and a destination storage apparatus to which the source volumes are migrated, the storage management system holding:

volume management information including information on owner apparatuses and characteristics of the source volumes;

destination pool configuration management information created based on user specifications through an input device and including sizes of volumes to be allocated from storage device groups in the destination storage apparatus to destination pools; and volume migration configuration management information created based on user specifications through the input device and including information on relations between the source volumes and the destination pools, the storage management method comprising:

determining source volume groups to which the source volumes belong based on the volume management information;

determining sizes of volumes to be allocated from the storage device groups to the destination pools based on the destination pool configuration management information;

determining sizes of volumes to be migrated from the source volume groups to the destination pools based on the volume migration configuration management information;

creating image data indicating information on the determined sizes of volumes to be allocated and the sizes of volumes to be migrated; and outputting the image data to a display device, wherein the image displayed with the image data includes sections each indicating information on one of the destination pools, wherein each of the sections is a column or a row consisting of a plurality of cells, wherein each of the sections includes a first subsection and a second subsection, wherein each cell in the first subsection indicates a size of volumes to be migrated from one of the source volume groups, and wherein each cell of the second subsection indicates a size of volumes to be allocated from one of the storage device groups.

* * * * *